(12) United States Patent
Lapidous et al.

(10) Patent No.: US 10,404,618 B2
(45) Date of Patent: *Sep. 3, 2019

(54) SYSTEM AND METHOD FOR IMPROVING AN AGGREGATED THROUGHPUT OF SIMULTANEOUS CONNECTIONS

(71) Applicant: AnchorFree Inc., Redwood City, CA (US)

(72) Inventors: Eugene Lapidous, Saratoga, CA (US); Maxim Molchanov, Mountain View, CA (US)

(73) Assignee: ANCHORFREE INC., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/156,784

(22) Filed: Oct. 10, 2018

(65) Prior Publication Data

US 2019/0044884 A1 Feb. 7, 2019

Related U.S. Application Data

(63) Continuation of application No. 15/254,583, filed on Sep. 1, 2016, and a continuation of application No.
(Continued)

(51) Int. Cl.
*G01R 31/08* (2006.01)
*H04J 1/16* (2006.01)
(Continued)

(52) U.S. Cl.
CPC .............. *H04L 47/827* (2013.01); *H04L 1/16* (2013.01); *H04L 43/0864* (2013.01); *H04L 43/0888* (2013.01); *H04L 45/245* (2013.01); *H04L 47/27* (2013.01); *H04L 47/41* (2013.01); *H04L 67/28* (2013.01); *H04L 67/325* (2013.01); *H04L 43/0835* (2013.01); *H04L 67/02* (2013.01); *H05K 999/99* (2013.01); *Y02D 50/30* (2018.01)

(58) Field of Classification Search
CPC ....... H04L 47/827; H04L 47/27; H04L 47/41; H04L 67/28; H04L 67/325; H04L 43/0864; H04L 43/0888
See application file for complete search history.

(56) References Cited

U.S. PATENT DOCUMENTS 10,142,262 B2 * 11/2018 Lapidous ................. H04L 1/16

* cited by examiner

*Primary Examiner* — Maharishi V Khirodhar
(74) *Attorney, Agent, or Firm* — David R. Stevens; Stevens Law Group

(57) ABSTRACT

A client and content provider are connected by a plurality of simultaneous transport connections. The number of the transport connections that are used to transfer data is selected based on the size of the data to be transferred and may change after transfer of data has commenced based on the amount of data left and the attributes of the transport connections. In another aspect, data to be transmitted over the transport connections is organized into frames such that each frame includes data from only one data stream. The frames are sized to be less than or equal to a control window of the transport connection over which they are transmitted. Each frame may be assigned to a transport connection in a round robin fashion or based on the size of the frame and the sizes of the control windows of the transport connections.

18 Claims, 10 Drawing Sheets

Related U.S. Application Data

15/254,732, filed on Sep. 1, 2016, and a continuation of application No. 16/022,335, filed on Jun. 28, 2018, and a continuation of application No. 16/022,369, filed on Jun. 28, 2018.

(60) Provisional application No. 62/343,697, filed on May 31, 2016.

(51) Int. Cl.
| | |
|---|---|
| *H04L 1/00* | (2006.01) |
| *H04L 12/911* | (2013.01) |
| *H04L 1/16* | (2006.01) |
| *H04L 12/807* | (2013.01) |
| *H04L 29/08* | (2006.01) |
| *H04L 12/26* | (2006.01) |
| *H04L 12/709* | (2013.01) |
| *H04L 12/891* | (2013.01) |

SYSTEM AND METHOD FOR IMPROVING AN AGGREGATED THROUGHPUT OF SIMULTANEOUS CONNECTIONS

RELATED APPLICATIONS

This application is a continuation of U.S. application Ser. No. 15/254,583 filed Sep. 1, 2016, and entitled SYSTEM AND METHOD FOR IMPROVING AN AGGREGATED THROUGHPUT OF SIMULTANEOUS CONNECTIONS, which claims the benefit of U.S. Provisional Application Ser. No. 62/343,697 filed May 31, 2016 and entitled SYSTEM AND METHOD FOR IMPROVING AN AGGREGATED THROUGHPUT OF SIMULTANEOUS CONNECTIONS, both of which applications are hereby incorporated herein by reference in their entirety.

This application is also a continuation of U.S. application Ser. No. 15/254,732 filed Sep. 1, 2016, and entitled SYSTEM AND METHOD FOR IMPROVING AN AGGREGATED THROUGHPUT OF SIMULTANEOUS CONNECTIONS, which is hereby incorporated herein by reference in its entirety.

This application is also a continuation of U.S. application Ser. No. 16/022,335 filed Jun. 28, 2018, and entitled SYSTEM AND METHOD FOR IMPROVING AN AGGREGATED THROUGHPUT OF SIMULTANEOUS CONNECTIONS, which is hereby incorporated herein by reference in its entirety.

This application is also a continuation of U.S. application Ser. No. 16/022,369 filed Jun. 28, 2018, and entitled SYSTEM AND METHOD FOR IMPROVING AN AGGREGATED THROUGHPUT OF SIMULTANEOUS CONNECTIONS, which is hereby incorporated herein by reference in its entirety.

BACKGROUND

The amount of online content downloaded over computer networks is rapidly increasing with time due to multiple factors: popularity of online video streaming and user-generated content, proliferation of social networks and media-rich messaging, cloud-based storage etc.

Requested content often must be delivered over long distances. Only the most popular videos can be cached near the user. Content that uses secure protocols like HTTPS can't be cached without disclosing at least some encryption keys to third parties. Remote viewing of events streamed in real time such as sports and news can't use caching. Local content is often not cached outside of the countries of origin.

Increase of the data travel distance often increases the rate of packet losses. If connection uses guaranteed-delivery protocol such as Transport Control Protocol (TCP), these losses are usually interpreted as last-mile congestion, resulting in significant decrease in the throughput even if each segment of the connection pipe is far from the saturation point.

Spreading the data transfer across multiple simultaneous guaranteed-delivery transport connections between the sender and the receiver usually increases the total throughput: adding each new connection increases the aggregated size of both receiver and congestion windows, allowing more data to be delivered during each round-trip interval. The speed of transferring large data files over the long distances increases with the number of simultaneous connections, until at least one segment of the connection pipe becomes congested or resources of the server and client computers (memory, CPU load, I/O capacity) become overstrained.

Therefore, there is a need to increase the speed of the data transfer over the multiple simultaneous connections for real-life scenarios, including bursts of limited-size data files.

SUMMARY OF THE INVENTION

In one aspect of the invention, a method for increasing an aggregated throughput includes establishing a plurality of simultaneous transport connections between a first computer and a second computer over a computer network. The method further includes receiving, by the first computer from the second computer, two or more groups of requests for data delivery to the second computer through the plurality of the simultaneous transport connections with the first computer such that a first group of the two or more groups of requests is constrained to be finished before a second group of the two or more groups of requests. The first computer determines whether delivery of requested data corresponding to each request for data delivery of the first group of requests is finished. If so, the first computer sets a number of the plurality of simultaneous transport connections used to deliver requested data corresponding to each request for data delivery of the second group of requests to the first computer such that a number of simultaneous transport connections used to deliver the requested data corresponding to each request for data delivery of the first group of requests is set to be different than the number of the plurality of simultaneous transport connections used to deliver the requested data corresponding to each request for data delivery of the second group of requests.

In some embodiments, each transport connection of the plurality of simultaneous transport connections uses a transport protocol that includes generating one or more acknowledgements to confirm delivery of the requested data corresponding to each request for data delivery of the first and second groups of requests. The method may further include determining that delivery of requested data corresponding to each request for data delivery of a same group of the two or more groups of requests is finished in response to receiving the one or more acknowledgements that the requested data corresponding to the each request in the same group is delivered.

In some embodiments, each transport connection of the plurality of simultaneous transport connections uses a Transport Control Protocol (TCP).

In some embodiments, the method further includes executing, by the first and second computers, a traffic distribution module programmed to establish the plurality of simultaneous transport connections between the first and second computers. The method may include opening, by a client computer, one or more client transport connections to request and receive requested data corresponding to each request of each group of the two or more groups of requests through the plurality of simultaneous transport connections opened between the second computer and the first computer. The client may close the client transport connections without invoking closing of the plurality of simultaneous transport connections between the first and the second computer. The method may further include determining that delivery of the requested data corresponding to each request for data delivery of a same group of the two or more groups of requests is finished by determining that the client computer has closed the one or more client transport connections. The client computer may be the second computer.

In some embodiments, the second computer hosts a proxy programmed to terminate the client transport connections. In some embodiments, at least two of the plurality of simultaneous transport connections are opened over a same physical data link. In some embodiments, at least two of the plurality of simultaneous transport connections have identical source and destination network addresses.

In some embodiments, the method includes determining, by one of the first computer and the second computer, an estimated size of data delivery for at least one group of the two or more groups of requests; and setting, by one of the first computer and the second computer, a number of simultaneous network connections used to transport requested data corresponding to requests of a same group of requests of the two or more groups of requests such that the number of simultaneous transport connections used to transport the requested data corresponding to the requests of the same group of requests increases with increase in the estimated size.

In some embodiments, the estimated size is determined by obtaining one or more network identifiers from the requests of the same group of requests, each identifier comprising at least one of a domain name and a destination network address.

In some embodiments, each of the plurality of simultaneous transport connections is associated with a control window limiting the amount of traffic that can be sent before receiving an acknowledgement that at least some data included in the traffic has been delivered. The method may further include determining, by one of the first computer and the second computer, an estimated size of one or more control windows of the plurality of simultaneous transport connections; and decreasing, by the one of the first and the second computer, the number of the plurality of simultaneous network connections used for delivery of requested data corresponding to a same group of requests of the two or more groups of requests with increase of the estimated size of the one or more control windows. In some embodiments, the control window is a smallest of a receiver window and a congestion window used by a transport protocol.

In some embodiments, the method includes changing the number of the plurality of simultaneous transport connections used to deliver the requested data corresponding to each request for data delivery of the second group after completing delivery of the requested data corresponding to each request of the first group of requests and before receiving the second group of requests.

In some embodiments, the number of the plurality of simultaneous transport connections used to deliver the requested data corresponding to each request of the second group of requests is decreased after delivery of the requested data corresponding to the first group of requests is followed by a period of inactivity exceeding a pre-defined time interval before the second group of requests is submitted.

In some embodiments, the method includes changing a number of the plurality of simultaneous connections used to deliver the requested data corresponding to a same group of requests of the two or more requests by at least one of pausing and resuming delivery of at least some of the requested data corresponding to the same group of requests through one or more previously opened simultaneous connections, without closing existing connections or opening new connections.

In some embodiments, the method includes setting a number of the plurality of simultaneous transport connections used for data transfer from the first computer to the second computer to be different from a number of the plurality of simultaneous transport connections used for data transfer from the second computer to the first computer.

In some embodiments, changing the number of the plurality of simultaneous transport connections used for the data transfer from the first computer to the second computer while maintaining constant the number of the plurality of simultaneous transport connections used for the data transfer from the second computer to the first computer.

In some embodiments, the first computer includes at least one of a proxy server and a VPN server.

Another aspect of the invention includes a system for increasing an aggregated throughput between computers over a computer network. The system includes a first computer including one or more processing devices programmed to:

receive a group of one or more requests for data delivery to a second computer through a plurality of simultaneous transport connections between the first computer and the second computer;

deliver requested data corresponding to the one or more requests for data delivery through at least a portion of the plurality of simultaneous transport connections such that delivery of requested data corresponding to each request of the one or more requests must be finished before delivery of requested data corresponding to a subsequent request of the one or more requests; and change a utilized number of the plurality of simultaneous transport connections that are used for delivery of the requested data corresponding to the one or more requests such that the utilized number is changed after the one or more requests are received by the first computer but before the delivery of the requested data corresponding to the one or more requests.

In some embodiments, the one or more processing devices are further programmed to:

during delivery of the requested data corresponding to the one or more requests for data delivery, generating at least one estimated value according to at least one of (a) a remaining amount of data of the requested data corresponding to the one or more requests to be delivered and (b) a parameter of data transfer through at least one transport connection of the plurality of simultaneous transport connections used for the delivery;

change the utilized number in accordance with change of the least one estimated value.

In some embodiments, the one or more processing devices are further programmed to decrease the utilized number with decrease of the remaining amount of data. In some embodiments, the one or more processing devices are further programmed to estimate the remaining amount of data according to an amount of requested data corresponding to the one or more requests that is stored in one or more buffers on the first computer before being sent to the second computer.

In some embodiments, the first computer includes at least one of a proxy server and a VPN server, and the said buffers are the ones used by that proxy or VPN server for temporary data storage.

In some embodiments, the parameter of data transfer through the at least one transport connection is a size of a control window limiting an amount of traffic that can be sent before receiving an acknowledgement that at least some of the traffic is delivered. The one or more processing devices may be further programmed to decrease the utilized number with increase of the size of the control window of one or more transport connections of the plurality of simultaneous transport connections.

In some embodiments the parameter of data transfer through the at least one transport connection is a rate of data losses over the at least one transport connection. The one or more processing devices may be further programmed to increase the utilized number with increase of the rate of data losses over the at least one transport connection.

In some embodiments, the one or more processing devices are further programmed to change the utilized number after receiving the group of one or more requests by one of pausing and resuming delivery of at least some of the requested data through the at least the portion of the plurality of simultaneous transport connections without closing any of the plurality of simultaneous transport connections or opening new transport connections.

In some embodiments the utilized number is a first utilized number and the one or more processing devices are further programmed to change the first utilized number independently of a second utilized number of the plurality of simultaneous transport connections that are used for data transfer from the second computer to the first computer.

In some embodiments, the one or more processing devices are further programmed to only change the first utilized number while maintaining constant the second utilized number.

In some embodiments, at least two transport connections of the plurality of simultaneous transport connections are opened over a single physical data link. In some embodiments, the one or more processing devices are further programmed to change the utilized number by changing a number of the at least two transport connections opened over the single physical data link.

In one aspect of the invention, includes a method for increasing an aggregated throughput of multiple simultaneous transport connections between computers over a computer network. The method may include:
  maintaining, by a first computer, a first plurality of simultaneous connections to a second computer and a second plurality of simultaneous transport connections to a third computer;
  receiving, by the first computer, a first group of one or more requests for a data delivery to the second computer over the first plurality of simultaneous transport connections with the second computer;
  delivering, by the first computer, requested data corresponding to the first group of one or more requests such the delivery of data corresponding to each requests of the first group of one or more requests must be finished before delivering data corresponding to a subsequent request to the second computer;
  receiving, by the first computer, a second group of one or more requests for data delivery to a third computer over a second plurality of simultaneous transport connections with the third computer;
  delivering, by the first computer, requested data corresponding to the second group of one or more requests such that delivery of data corresponding to each request of the second group of one or more requests must be finished before delivering data corresponding to a subsequent request to the third computer;
  setting, by the first computer, a first number of the first plurality of simultaneous transport connections that are used to deliver the requested data corresponding to the first group of one or more requests;
  setting, by the first computer, a second number of the second plurality of simultaneous transport connections that are used to deliver the requested data corresponding to the second group of one or more requests;
  detecting, by the first computer, a difference between one or more first parameters of the first plurality of simultaneous transport connections and one or more second parameters of the second plurality of simultaneous transport connections;
  setting, by the first computer, the first number and the second number to be different according to the difference between the one or more first parameters and the one or more second parameters.

In some embodiments, detecting the difference between the one or more first parameters and the one or more second parameters comprises detecting a difference in at least one of a distance from the first computer to the second computer and a distance from the first computer to the third computer, a round-trip time between the first computer and the second computer and a round-trip time between the first computer and the third computer, and a quality of a network connecting the first computer and the second computer and a quality of a network connecting the first computer and the third computer.

In some embodiments, setting the first number comprises increasing the first number with at least one of increase in the distance between the first computer and the second computer and the round-trip time between the first computer and the second computer. In some embodiments, setting the second number comprises increasing the second number with at least one of increase in the distance between the first computer and the third computer and the round-trip time between the first computer and the third computer.

In some embodiments, setting the first number comprises decreasing the first number with increase of the quality of the network between the connecting the first computer and the second computer relative to the quality of the network connecting the first computer and the third computer. In some embodiments, setting the first number comprises decreasing the first number with decrease in a rate of data losses over the first plurality of simultaneous transport connections; and In some embodiments, setting the second number comprises decreasing the second number with decrease in a rate of data losses over the second plurality of simultaneous transport connections.

In some embodiments, each of the first plurality of transport connections and the second plurality of transport connections implement a transport protocol defining control windows that limit an amount of traffic that may be sent before an acknowledgement of at least some of the traffic has been received. Setting the first number may include decreasing the first number with increase of a size of the control windows for the first plurality of transport connections. Setting the second number may include decreasing the second number with increase of a size of the control windows for the second plurality of transport connections.

In some embodiments, the transport protocol is a Transport Control Protocol (TCP), and the control window is a smaller of a receiver window and a congestion window.

BRIEF DESCRIPTION OF THE FIGURES

In order that the advantages of the invention will be readily understood, a more particular description of the invention briefly described above will be rendered by reference to specific embodiments illustrated in the appended drawings. Understanding that these drawings illustrate only typical embodiments of the invention and are not therefore to be considered limiting of its scope, the invention will be described and explained with additional specificity and detail through use of the accompanying drawings, in which.

DETAILED DESCRIPTION

Figure 1:
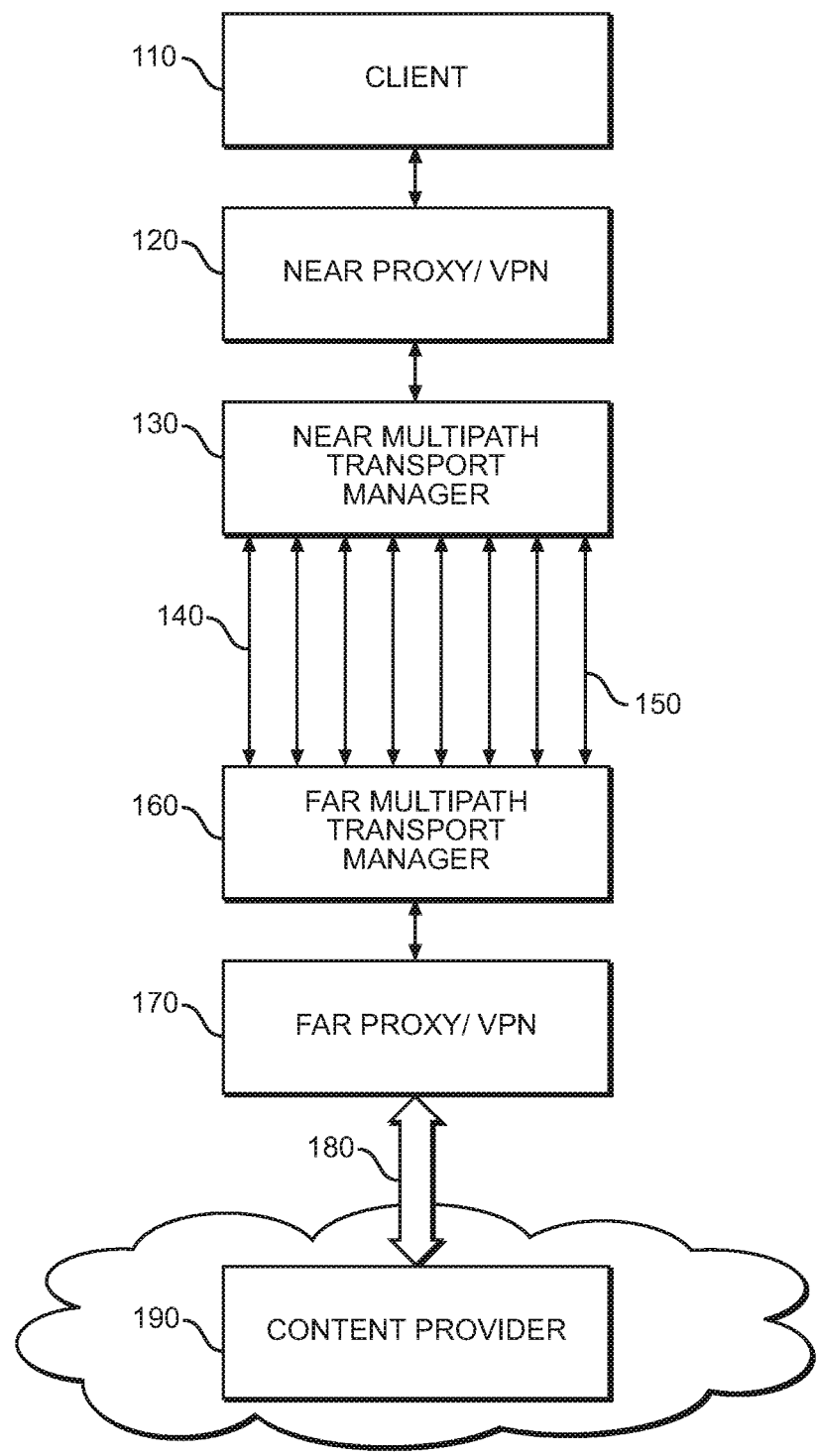
FIG. 1 is a schematic block diagram of a first network environment that may be used to increase throughput by transferring the data through multiple simultaneous transport connections in accordance with an embodiment of the present invention.

It will be readily understood that the components of the invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Embodiments in accordance with the invention may be embodied as an apparatus, method, or computer program product. Accordingly, the invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the invention may be written in any combination of one or more programming languages, including an object-oriented programming language such as Java, Smalltalk, C++, or the like and conventional procedural programming languages, such as the "C" programming language or similar programming languages, and may also use descriptive or markup languages such as HTML, XML, JSON, and the like. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider). Computer networks may use transport protocols other than Internet Protocol. Correspondingly, present invention could be implemented for types of network addresses other than IP addresses.

The invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

If there is a sufficient bandwidth capacity (congestion is not an issue), the number of simultaneous connections over the long distances is usually preset to a maximal value that can be sustained without overwhelming resources of the server and client computers. However, most of the data files transferred over a typical computer network have relatively small sizes. Such transfers often happen in bursts, followed but the periods of inactivity (for instance, download of a web site). Increasing the number of simultaneous connections could be less effective for such limited data transfers, even in the absence of congestion. The embodiments disclosed herein provide an improved approach for setting the number of simultaneous connections used to transfer data.

In one aspect of the invention, a first computer receives two or more groups of requests for a data delivery to a second computer through a plurality of the simultaneous transport connections with the first computer, where the first group of requested deliveries must be finished before submitting the second group of requests. In some embodiments, the first computer includes means for determining that requested data delivery is finished and means for setting the number of the simultaneous connections used to deliver the requested data to the first computer, and means for setting a different number of simultaneous connections used to deliver the first group of requested data than the number of simultaneous connections used to deliver the second group of requested data.

In some embodiments, each of two or more simultaneous transport connections uses a transport protocol generating acknowledgements to confirm the data delivery, and the requested data delivery is determined to be finished after receiving acknowledgements that requested data is delivered. In some instances, this protocol is a Transport Control Protocol (TCP).

In an embodiment of the present invention, the first and the second computers contain traffic distribution modules enabled to establish multiple simultaneous connections between these computers, and the data delivery requests are generated by the client computer that opens one or more transport connections to request and receive the data through the simultaneous connections between the second and the first computers. According to this embodiment, the requested data delivery is determined to be finished after the client computer closes the connections it opened to request and receive the data. In some instances, the client computer is the second computer. In one more instance, the second computer contains a proxy enabled to terminate transport connections opened by the client computer.

In some embodiments, at least two of the simultaneous transport connections are opened over the same physical data link. In some instances, these connections share the same source and destination network addresses.

In some embodiments, first computer obtains an estimation of the size of at least one of the first or the second data delivery, and increases the number of simultaneous network connections used for corresponding delivery with increase of the estimated size. In some instances, the size of the data delivery is estimated by obtaining one or more network identifiers from the first group of requests, each identifier comprising at least one of a domain name and a destination network address.

In another embodiment, where each of one or more simultaneously opened connections is associated with a control window limiting the amount of traffic that can be sent before receiving an acknowledgement that at least some data is delivered, the first computer obtains estimated size of one or more control windows, and decreases the number of simultaneous network connections used for the data delivery with increase of that size. In some instances, the control window is a smallest of a receiver window and a congestion window used by a transport protocol.

In some embodiments, the number of simultaneous connections used for the data delivery is changed after finishing the delivery of the first group of requested data, and before the second group of requests is submitted. In some instances, the number simultaneous connections used for the data delivery is decreased after the delivery of the first requested data is followed by a period of inactivity exceeding the pre-defined time interval, before the second group of data requests is submitted.

In other embodiments, the number of simultaneous connections used for the data delivery is changed by pausing or resuming delivery of at least some requested data through one or more previously opened simultaneous connections, without closing existing connections or opening new connections. In some instances, the number of simultaneous connections used for a data transfer from the first server to the second server is changed differently from the number of simultaneous connections used for the data transfer from the second server to the first server. In some implementations, only the number of simultaneous connections used for the data transfer from the first server to the second server is changed, while the number of simultaneous connections used for the data transfer from the second server to the first server remains the same.

In some embodiments, the first computer comprises at least one of a proxy server and a VPN server.

In one aspect of the present invention, a first computer receives a group of one or more requests for a data delivery to a second computer through a plurality of the simultaneous transport connections, and the delivery of the requested data must be finished before submitting at least one other request. First computer starts the delivery of requested data, and then changes the number of simultaneous connections used for the data delivery before the delivery of the requested data is finished.

In some embodiments, the first computer obtains estimation of at least one of the remaining amount of data to be delivered and at least one parameter of the data transfer through at least one of the simultaneous transport connections used for that delivery, and then changes the number of simultaneous connections with the change of an estimated value. In some instances, first computer decreases the number of simultaneous connections used to deliver the remaining amount of data with the decrease of this amount. In some instances, the remaining amount of the data to be delivered is estimated from the amount of requested data that are stored in one or more buffers on the first computer before being sent to the second computer. In some implementations, the first computer includes at least one of the proxy and VPN server, and said buffers are used by the proxy or VPN server for temporary data storage.

In another instance, at least one of the parameters of the data transfer through a transport connection is a control window, which limits the amount of traffic that can be sent before receiving an acknowledgement that at least some data is delivered, and the number of simultaneous connections used to deliver the remaining data is decreased with increase of the size of one or more of these windows.

In some instances, at least one of the parameters of the data transfer through a transport connection is an amount of data losses over that connection, and the number of simultaneous connections used to deliver the remaining data is increased with the rate of data losses over one or more transport connections.

In some embodiments, the number of simultaneous connections used for the data delivery is changed after the group of requests is submitted by pausing or resuming data delivery through one or more previously opened simultaneous connections, without closing existing connections or opening new connections. In some instances, the number of simultaneous connections used for a data transfer from the first server to the second server is changed differently from the number of simultaneous connections used for the data transfer from the second server to the first server. In some implementations, only the number of simultaneous connections used for the data transfer from the first server to the second server is changed, while the number of simultaneous connections used for the data transfer from the second server to the first server remains the same.

In some embodiments, at least two of the simultaneous transport connections are opened over the same physical data link, and changing the number of used simultaneous connections comprises changing the number of the simultaneous connections used for the data delivery over that data link.

In another aspect of the present invention, the first computer receives two or more groups of requests for a data delivery to a second computer through a plurality of the simultaneous transport connections with the first computer, where the first group of requested deliveries must be finished before submitting the second group of requests. The first computer also receives two or more groups of requests for a data delivery to a third computer through a plurality of the simultaneous transport connections with the first computer, where the first group of requested deliveries must be finished before submitting the second group of requests. In this aspect, first computer uses the different number of simultaneous connections to the second computer than to the third computer, if there is a difference between one or more parameters of connections from the first computer to the second and the third computers.

In some embodiments, this is the difference in at least one of the distance from the first computer, round-trip time and quality of the network. In some instances, the number of simultaneously used connections is increased with increase of the distance to the first computer or with increase of the round-trip time to the first computer. In another instance, the number of simultaneously used connections is decreased with increase of the quality of the network between the second and the first computer, as compared to the quality of the network between the third and the first computer. In other instances, the number of simultaneously used connections is decreased with decrease of the rate of the data losses over one or more transport connections.

In some implementations, one or more transport connections use transport protocol that sets a control window to limit the amount of data that can be sent before receiving the acknowledgement for at least some of the sent data, and the number of simultaneously used connections is decreased with increase of the size of one or more of the control windows. In some embodiments, the transport protocol is a Transport Control Protocol (TCP), and the control window is the smallest of the receiver window and the congestion window.

In an aspect of the present invention, a system for increasing an aggregated throughput of multiple simultaneous transport connections between computers over a computer network includes a traffic management module, enabled to receive one or more requests and obtain the requested data for a transfer from a first computer to a second computer through a plurality of simultaneous transport connections between the first computer and the second computer, where the transfer of the requested data must be finished before receiving at least one other request from the second computer, a traffic distribution module, enabled to split the requested data into two or more groups and to forward two or more of the data groups to different transport connections, and a traffic tuning module, enabled to obtain preferred range of the data group sizes for one or more used connections and to set the data group size for one or more used connections within the preferred range.

In some embodiments, traffic tuning module obtains the maximal number of available transport connections and sets the data group size for each used connection, while traffic distribution module forwards each data group to a different transport connection, until the delivery of requested data is completed or until the number of used transport connections reaches the maximal number of available connections, thereby using smaller number of transport connections than the maximal number of available connections when the size of requested delivery falls below the sum of preferred group sizes for available connections. In some instances, the maximal number of available transport connections is set to the number of currently opened simultaneous connections between the first and the second computer, and at least one of the currently opened connections is not used for delivery of the requested data. In some implementations, the number of used transport connections increases with increase of the amount of data delivered to the second computer.

In another embodiment, the traffic distribution module obtains the data received in response to at least two different requests from one or more temporary buffers, forms at least one data group containing only the data obtained in response to the same request, and then distributes that data group to a single transport connection. In some implementations, the data group sent to a single connection in response to a single request is provided in the ordered sequence. In some embodiments, the traffic distribution module adds headers to data groups sent to the different transport connections, at least one header including an identifier of the data corresponding to a single request and the size of the data group. In some instances, one or more data groups are formatted accordingly to the Hyper Text Transport Protocol (HTTP) version 2 or higher.

In another embodiment, each data group is forwarded to one transport connection before the next data group is forwarded to the next transport connection, until all requested data is forwarded to simultaneous transport connections.

In other embodiments, the preferred range of the data group sizes is set differently for at least two different simultaneously used connections.

In yet another embodiment, one or more transport connections use transport protocol setting a control window to limit the amount of data that can be sent before receiving the acknowledgement for at least some of the sent data, and the range of preferred data group sizes increases with increase of the size of one or more of the control windows. In some instances, the transport protocol is a Transport Control Protocol (TCP), and the control window is the smallest of the receiver window and the congestion window. In another instance, the maximal value of the preferred range for at least one connection is set to be less or equal than the size of the control window for that connection. In other instances, the minimal value of the preferred range for at least one connection is set to be greater than the half of the size of the control window for that connection.

In the other embodiment, one or more transport connections use transport protocol limiting the amount of data that can be sent through a connection without receiving an acknowledgement of at least some previously sent data, and the range of preferred data sizes is set to send the group of data through at least one connection before receiving an acknowledgement for the previously sent data.

In other embodiments, the range of preferred data sizes is set to send the group of data through at least one connection in the time of one round trip between the first and the second computers.

In another embodiment, at least two of the simultaneous transport connections are opened over the same physical data link. In some instances, at least two of the simultaneous transport connections have the same source and destination network addresses.

In some embodiments, the traffic management module includes at least one of the proxy and VPN.

In another aspect of the present invention, the system for increasing an aggregated throughput of multiple simultaneous transport connections between computers over a computer network includes at least the traffic management module and the traffic distribution module. The traffic management module receives two or more requests for a data transfer from a first computer to a second computer over plurality of simultaneously opened connections, obtains the data in response to two different requests, and then form two or more data frames containing response to the different requests, each data frame containing the data corresponding to a single request. The traffic distribution module forwards the data frames to two or more different transport connections, each of at least two data frames being forwarded to a single transport connection, thereby transferring at least one data frame through each transport connection.

In some embodiments, traffic management module multiplexes two or more data frames into the same queue, storing a sequence of two or more data frames, and then traffic distribution module obtains each of at least two data frames from the same queue before forwarding them to the separate transport connections.

In the other embodiment, the number of used transport connections increases with increase of the amount of requested data that is delivered to the second computer.

In another embodiment, requested data must be delivered over the simultaneous transport connections before receiving at least one other request for a data delivery, and the sizes of one or more data frames are increased with decrease of the remaining amount of data that must be delivered.

In other embodiments, the sizes of one or more data frames are increased with increased throughput of one or more transport connections between the first and the second computer. In some instances, increase of the throughput is determined by detection of at least one of the decrease of the packet loss rate and increase of the amount of data allowed to be sent before receiving an acknowledgement for the previously sent data from one or more used transport connections.

FIG. 1 illustrates an example implementation of the present invention. Client computer 110 issues two or more groups of requests for data delivery through a near proxy or VPN 120 to a far proxy or VPN 170, which passes the requests to a content provider 190 through a high-bandwidth pipe 180. In the presented example, near proxy or VPN 120 is located at a significantly large distance from the far proxy or VPN 170, increasing the rate of packet losses between the two computers. To prevent these losses from degrading the throughput, near proxy or VPN 120 may be coupled with a near multipath transport manager 130. The far proxy or VPN 170 may also be coupled with far multipath transport manager 160, and the traffic between the near and far transport manager is distributed through multiple simultaneous connections 140, 150.

In the illustrated embodiment, simultaneous transport connections 140 are used to transport the requested data; while transport connections 150 remain open, but are not used to transport the requested data. This allows changing the number of used connections 140 to be increased or decreased without spending the time to open new connections or to close the old ones. In another embodiment, transport connections may be closed or opened at any time, with or without being immediately used for data transfer.

In some implementations, at least some of the transport connections 140, 150 are opened over the same physical data link covering at least part of the route between the near and far computers 110, 190. For instance, multiple connections can be opened by using the same last-mile ISP (internet service provider), or a wireless service provider. In some embodiments, multiple connections are opened between the same source and destination IP addresses, using only the source port to distinguish between multiple connections. This implementation increases the probability that multiple connections will use the same route between the client and the content provider, passing through the same intermediate router. In some instances, this approach is used to extrapolate network properties of a new connection, such as a round-trip time or a packet loss rate, from the network properties of already opened connection, or to pre-set the control window of the new connection from a control window obtained from the existing connection.

In another implementation, two or more simultaneous connections can be opened through different data links (for instance, both Wi-Fi and cellular connections), or can pass through the different routes due to the differences in the destination IP addresses. This could help to select an improved set of connections for the data transfer depending on their individual parameters; even if multiple connections are established over the same last-mile ISP to the same distant server, use of the different destination IP addresses pointing to the same server may change the network parameters of each connection due to the different routes taken by the packets between the two computers 110, 190.

In some implementations, modules 120 and 170 are, correspondingly, a proxy client and a proxy server. Connections opened by the client 110 are terminated by the near proxy client 120, which sends the request payload and receives the response payload through multiple transport connections established between transport managers 130, 160 with the far proxy server 170. In some embodiments, transport connections 140, 150 use a reliable delivery protocol such as Transport Control Protocol (TCP), which provides guaranteed delivery of the payload and benefits from using simultaneous transport connections to increase aggregated control window.

In another implementation, modules 120 and 170 are, correspondingly, a Virtual Private Network (VPN) client and a VPN server. Data packets generated by the client 110 are shifted to the user space by the near VPN client 120. Near traffic manager 120 encapsulates the outgoing packets into the simultaneous transport connections 140. Far traffic manager 160 extracts original packets and, together with far VPN server 170, sends them to the content provider 190.

Data returned by the content provider 190 are processed in the reverse order. In this case, simultaneous transport connections help to improve throughput mostly by decreasing the queue sizes on any intermediary routers and mitigating bandwidth changes between the data link segments. In particular, such intermediary routers usually maintain one queue per connection and decreasing each queue size helps to decrease the latency and packet loss due to overflows. If client 110 opens multiple connections using a reliable delivery protocol, multiple simultaneous connections between VPN client 120 and VPN server 170 help to avoid decrease in performance caused by concentrating all client connections into a single queue.

Some implementation may contain both a proxy client and a VPN client 120 as well as a proxy server and a VPN server 170 used in parallel. In some embodiments, all TCP traffic originating from the client 110 is terminated by the client proxy 120 and its payload is sent through multiple TCP transport connections 140. In such embodiments, all UDP (user datagram protocol) traffic originating from the client 110 is encapsulated by the VPN client 120 and is sent through multiple UDP connections.

In some implementations, near proxy or VPN 120 resides on the same computer as multipath transport manager 130. In some embodiments, they reside on the same computer as the client 110. In another implementation, any one or two of these components 110, 120, 130 may reside on different computers.

In some implementations, far proxy or VPN 170 resides on the same computer as far multipath transport manager 160; in another implementation, they may reside on different computers.

Proxy or VPN modules 120, 170 are useful when the content server 190 doesn't support delivery of the same data file through the multiple parallel connections.

In an alternative embodiment where content server 190 is capable of such support, the client 110 directly sends traffic to the near multipath transport manager 130 without using a proxy or VPN client 120. In such embodiments, the content provider 190 receives the request from and sends the data to the far multipath transport manager 160 without using a proxy or VPN server 170. This embodiment can be realized, for instance, if both client 110 and the content provider 190 support Multipath TCP protocol extension.

Figure 2:
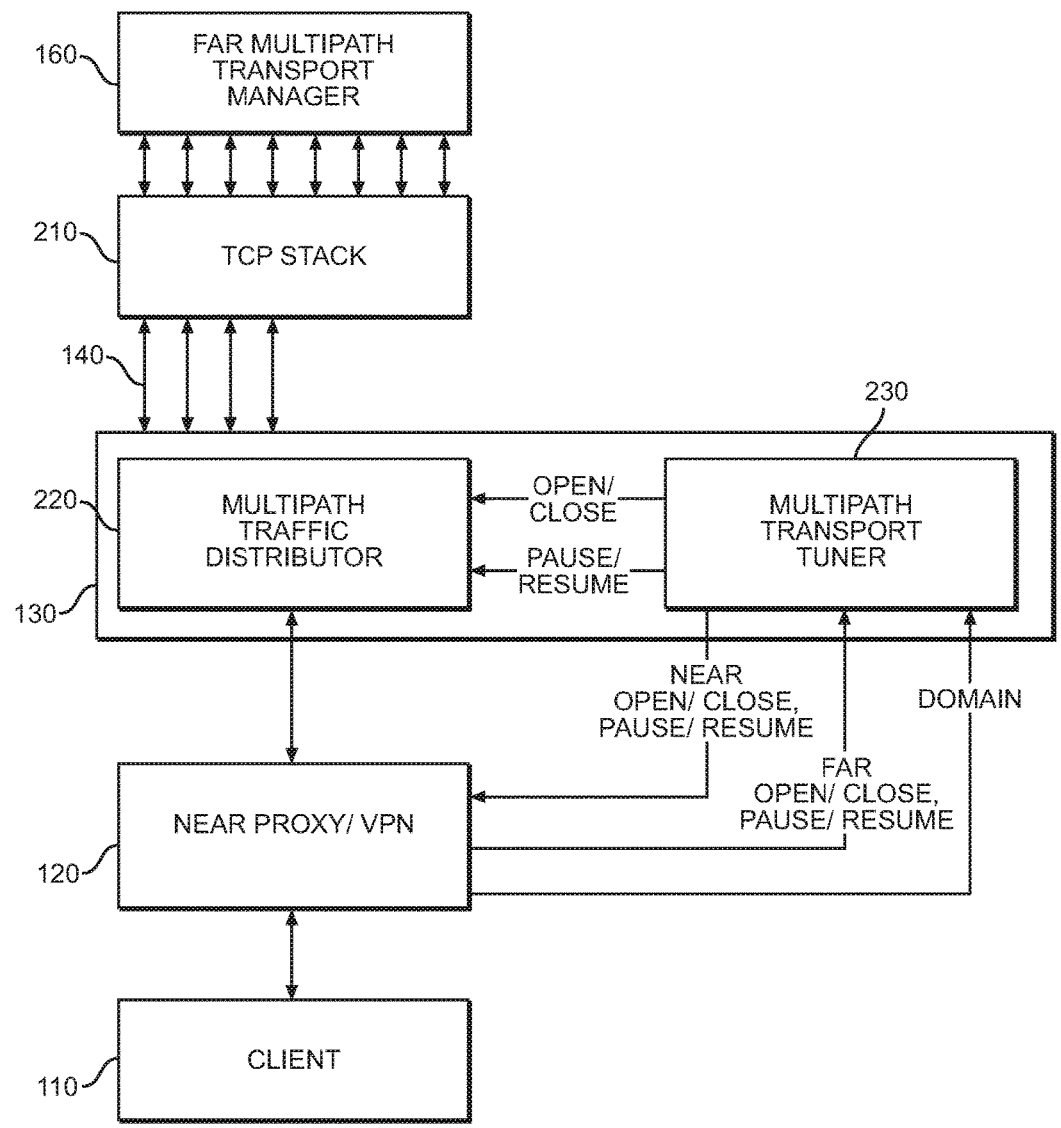
FIG. 2 is a schematic block diagram of a second network environment used to change the number of simultaneous transport connections accordingly to embodiment of the present invention in accordance with an embodiment of the present invention.

FIG. 2 illustrates an example implementation of the near multipath transport manager 130. In this implementation, the near multipath transport manager 130 contains a multipath traffic distributor 220 and a multipath transport tuner 230, both connected to a near proxy or VPN 120, communicating with the client 110. Near multipath transport manager 130 exchanges the data with a TCP stack 210, which maintains simultaneous transport connections with the far multipath transport manager 160. In the depicted embodiment, multipath traffic distributor 220 receives commands to open or close connections, or to pause or resume traffic through existing connections from the multipath transport tuner 230. If new connection must be opened or closed, multipath traffic distributor 220 sends the command to the TCP stack 210; if use of existing connection must be paused or resumed, multipath traffic distributor changes the distribution algorithm without the need to inform the TCP stack 210.

In the described implementation, multipath transport tuner 230 obtains information from the data from a proxy or VPN 120 that helps it to change the number of used simultaneous connections. In this example, it receives the information about the requests issued by the client 110, including but not limited to domain (hostname), IP address, port and HTTP headers. In some embodiments, this information is used to detect a pattern of requests that indicates the download of a web site of a known size. Size estimation is used to change the number of connections as described below. Additional information may also include a content size provided in response to a content request, or information from other sources such as a TCP stack 210 (which is possible only if near multipath transport manager has sufficient system privileges).

In an alternative implementation, multipath transport tuner 230 makes a decision to set or change the number of used connections 140 by observing a round-trip time to the far multipath transport manager 160, or the time to first byte delivered after a call to the far transport manager's 160 API.

In yet another implementations, multipath transport tuner 230 may set or change the number of used connections based on an elapsed time since a start of a connection session, user status, or time of day, for instance when it correlates with known patterns of network congestion.

In addition to receiving the data needed to determine whether to increase or decrease the number of used simultaneous connections, multipath transport tuner 230 also receives, from proxy or VPN 120, control information from the far multipath transport manager 160, such as by receiving feedback through a persistent TCP connection to an API (application programming interface) exposed by the far multipath transport manager 160. The multipath transport tuner 230 may also inform the far multipath transport manager 160 about the decisions to open or close and pause or resume transport connections. Again, this may include issuing an API call to a known network address referencing the far multipath transport manager 160. In some embodiments, connections can be opened only by the near multipath transport manager 130. However, in a typical embodiment, both near and far multipath transport managers 130, 160 can pause or resume connections.

In some implementations, near multipath transport manager uses different connections to send its data than the far multipath transport manager. In this implementation, number of transport connections used in one direction is different from the number of transport connections used in another direction; some connections are used to exchange the traffic in both directions, while others are used only to exchange the traffic in one direction.

In another embodiment, multipath traffic distributor 220 can be combined with multipath transport tuner 230, or implemented as a TCP stack modification (which usually requires root-access permissions). Instead of communicating through the proxy or VPN 120, near multipath traffic manager 130 can be integrated with the client 110.

Figure 3:
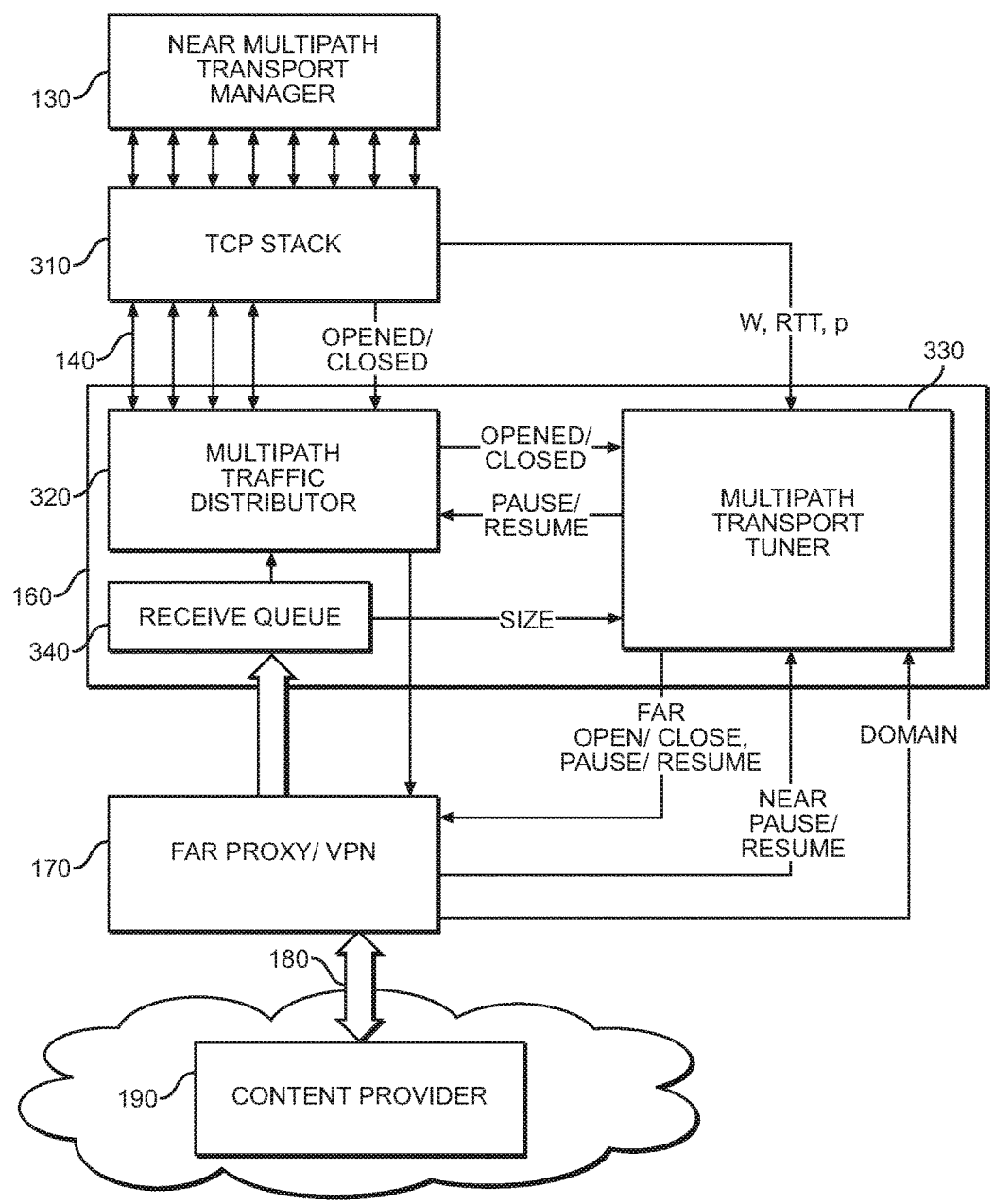
FIG. 3 is a schematic block diagram of a third network environment used to change the number of simultaneous transport connections in accordance with an embodiment of the present invention.

FIG. 3 illustrates an example implementation of the far multipath transport manager 160. In this implementation, the far multipath transport manager 160 contains a multipath traffic distributor 320 and a multipath transport tuner 330, both connected to a far proxy or VPN 170, which communicates with the content provider 190. Far multipath transport manager 160 exchanges data with the TCP stack 310, which maintains simultaneous transport connections with the near multipath transport manager 130. In the depicted embodiment, multipath traffic distributor 320 receives commands to pause and resume traffic through already opened connections from the multipath transport tuner 330. However, in contrast to the near multipath traffic distributor 220, the multipath traffic distributor 320 does not open or close the transport connections in some embodiments, but rather only receives the information about opened or closed connections from the TCP stack 310 and passes this information to the multipath transport tuner 330. This reflects the case when new transport connections are initiated by the module 130 near to the client 110. If multipath transport tuner 330 determines to open or close one or more connections, it passes this information through the proxy or VPN 170 to the near multipath transport manager 130.

The multipath transport tuner 330 also receives feedback about the connections opened or closed, paused or resumed by the near transport manager 130, and uses the information, such as a pattern of requested domains or IP addresses, to help it to set or change the number of used transport connections 140. In some embodiments, the multipath transport tuner 330 determines that delivery of requested data corresponding to a group of requests is finished in response to determining that the client 110 has invoked closing the one or more transport connections it has previously opened.

In some embodiments, proxy or VPN 170 is connected to a content provider 190 though a pipe 180 that may have higher throughout than a pipe between the far and the near traffic transport managers, at least for single connections. This could be the case, for instance, if far proxy or VPN 170 is located much closer to the content provider 190 than to a near proxy or VPN. 120. In the described embodiment, difference in the throughput is mitigated by a receive queue 340. The receive queue 340 may be embodied as a buffer storing the data downloaded from the content provider 190 before the data are transferred to the client 110. Multipath traffic distributor 320 reads the data from the receive queue 340 before distributing it between multiple simultaneous connections 140.

In the described embodiment, multipath transport tuner 330 estimates the size of the data that remains to be delivered to the client by the size of the data stored in the receive queue 340. For instance, if a single file is loaded from the content provider 190 through the high-throughput pipe 180, and the size of the data stored in the receive queue 340 starts to decrease with time, it could be interpreted as an indicator that this is the last remaining data for the requested delivery. Multipath transport tuner 330 may use this information to change the number of used simultaneous transport connections 140 after the delivery was started.

In another instance, the client 110 may issue multiple requests to different content providers 190, with responses being stored in one or more receive queues 340 before being transferred to the client 110. In this case, multipath traffic tuner 330 may receive information about the data stored in each of these queues 340 and consider the data delivery from the content provider 190 to be completed when each of the queues 340 has less data than its maximal buffer size, and the total amount of stored data decreases over time.

In another aspect of depicted embodiment, multipath transport tuner 330 receives one or more parameters of already opened transport connections from the TCP stack 310, such as a size of a control window W (or sizes of both receiver window and a congestion window, for instance, used by a TCP transport protocol), round-trip time to a near TCP stack 210 and the rate of packet losses. This information can be collected for one or more opened transport connections. This information is usually available on the server side because the system administrator can set higher level of access privileges in a secure server environment.

In some implementations, the same far multipath transport manager 160 receives connections opened by two or more near multipath transport managers 130 that are connected to the different clients 110. In this case, multipath traffic tuner 330 evaluates parameters associated with connections to each client 110, for instance, a round-trip-time, and advises different near transport managers 130 to open different numbers of simultaneous connections, or use different number of already opened connections with different clients 110. After the initial number of connections with each client 110 is set, it can be modified before the data delivery is completed (for instance, based on a changing size of the control window W or the size of the data remaining the receive queue 340).

In an alternative implementation, multipath traffic distributor 320 can be integrated with the content provider's server 190, without being connected to it through the far proxy or VPN 170. In this case, content provider's server can provide more precise information about the size of requested delivery, even if data reaching the multipath traffic distributor 320 are encrypted.

In another implementation, far multipath traffic manager 160 can be integrated with the TCP stack 310, without separately implementing multipath traffic distributor 320 and multipath transport tuner 330.

Accordingly to the described embodiments, different number of simultaneous transport connections 140 can be used to deliver the data for different group of requests, or to the different clients 110 even if they have requested the same content. Moreover, the number of connections 140 used in each case may change after the group of requests is issued, but before the data delivery corresponding to the group of requests is completed.

These embodiments can be used for multiple purposes, for instance, as a means to obfuscate proxy or VPN traffic from external censors by creating different connection patterns for different users and different content requests.

In another instance, changing the number of transport connections 140 can be used to enforce fairness of bandwidth consumption over a shared bandwidth bottleneck: the number of connections is increased only if there is a bandwidth capacity not utilized by the other users or if the bandwidth is a dedicated resource not shared with other users.

In some embodiments, the number of used connections 140 is changed with the number of requested files, even if the same file is transferred over the multiple connections. This makes it fairer to the proxy or a VPN user, as compared with the case when multiple files are transferred over a single proxy or VPN connections.

One function of the disclosed embodiments is to tune the throughput over the long distances between the clients 110 and content providers 190. Spreading the data transfer across multiple guaranteed-delivery transport connections 140 between the sender and the receiver usually increases the total throughput, especially when connections use a transport protocol that ensure guaranteed delivery, such as Transport Control Protocol (TCP), which limits the amount of in-flight data between the sender and receiver to the size of the control window, which is typically the smallest of the receiver window (amount of data that can be accepted by the receiver) and the congestion window (calculated by the sender to stop a link between the sender and the receiver from getting overloaded with too much traffic).

In this case, adding each new connection 140 increases the aggregated size of both receiver and congestion windows, at least until the aggregated congestion window becomes limited by increased packet losses on the shared link. Aggregating congestion windows also has additional benefit of mitigating effect of the random packet losses. For instance, if the congestion window for one connection drops 50% after packet loss, the aggregated congestion window for ten parallel connections only decreases by 5%.

If a connection 140 is fully occupied by transporting the data, its average throughput may be estimated as T=W/RTT, where W is a size of the control window and RTT is an average round-trip time.

If an amount of data S is transferred over a connection 140 with control window W, and assuming that this amount is sent as N packets, each having a maximal segment size MSS~=1500 B such that S=N*MSS), a time t1 to deliver these data over this connection can be estimated as $$t1=(N/W)*RTT \quad (1)$$

If the same amount of data is transferred over M parallel connections, each connection only has to transfer N/M packets (equivalent to aggregated connection using W*M control window), and the time tM to deliver these data becomes M times smaller:

$$tM=(1/M)*(N/*W)*RTT \quad (2)$$

As long as the aggregated congestion window is not limited by a shared link, and all parallel connections have reached a stable throughput (average W for each parallel connection is the same as for a single connection), a person skilled in the art may conclude that the data transfer through M parallel connections is always faster than through the single connection for any M>1.

However, this conclusion implicitly assumes that the data transfer continues after the N packets are sent through the pipe (allowing congestion control algorithm to maintain the stable throughput). In practice, delivery of the requested data must often be confirmed before proceeding with additional data transfers. For example:

(1) A requested file must be completely downloaded and processed before automatically requesting the next file (for instance, browser receives a JavaScript file, executes its code and then issues requests generated by that code).

(2) The user issues a request for a next file or a group of files after reviewing previously requested content (for instance, load of the web site is followed by a period of inactivity until user clicks on the link).

(3) The amount of the data that must be confirmed before proceeding with the next transfers usually depends on the type of requested content. For instance: single JavaScript file ~10 to 100 KB; news web site ~0.5 to 5 MB, video ~=20 to 2000 MB.

Requirement to confirm delivery of N packets before proceeding with next data transfers changes delivery times in two ways.

First, the connection pipe may not always be filled with the maximal number of in-flight packets (W). For instance, if W=100 but only 10 packets are sent through one connection, it will take the same time to deliver and confirm them (RTT) as for 100 packets. Increase in the number of parallel connections can cause the number of packets sent through each connection to drop below W, decreasing its throughput.

Second, the probability of losing the last packet in any connection increases with the number of parallel connections. If any of M connections loses its last packet, confirmation that all N packets are delivered is delayed until that packet is recovered.

Most of the congestion control protocols, including the ones implemented as part of TCP, introduce an additional delay when last packet through a transport connection is lost. Congestion control protocol usually waits for an additional time before retransmitting such lost packet (tail loss delay). If last packet is restored after the first retransmit, total time to re-deliver the last packet can be estimated as tail_loss_delay+RTT=TLDF*RTT (TLDF is a time loss delay factor >1).

In some implementations of the Linux operating system, time loss delay equals to retransmit timeout (RTO): for the first retransmit, time_loss_delay~=SRTT+4*RTTVAR, where SRTT and RTTVAR are the RTT value and its variation, respectively, averaged over multiple ACKs. For instance, if RTTVAR/SRTT=0.5, TLDF~=4.

In one known improvement implemented in the Linux operating system, the sender issues a duplicate of the last packet, known as a tail loss probe (TLP), decreasing time loss delay for the first retransmit to 2*SRTT (TLDF~=3).

In these examples TLDF is estimated on the assumption that lost packet is re-delivered after the first retransmission attempt. If retransmitted packet is also lost, it may increase the next RTO, or cause a switch from the TLP to RTO, further delaying the next retransmission attempt and increasing average TLDF.

Assuming that probability of the single packet loss (p) is the same for any packet in any connection, probability that at least one of M connections would lose its last packet $P=1-(1-p)^M$ (~=p*M for p*M<0.5).

After accounting for incompletely filled connection pipes and tail loss delays, times to transfer and confirm delivery of N packets through the single connection (t1) and through M parallel connections (tM) are:

$$t1=\text{ceiling}(N/W)*RTT+p*TLDF*RTT \text{ and} \quad (3)$$

$$tM=\text{ceiling}(1/M)*(N*W))*RTT+(1-(1-p)^M)\\*TLDF*RTT, \quad (4)$$

where ceiling(X) is a function returning closest integer K>=X.

If there are no packet losses (p=0), M can be pre-set to a high number without decreasing the aggregated throughput even for small N/W: tM=RTT for any M>N/W (delivering and confirming a single packet takes the same time as for W packets).

However, presence of packet losses (p>0) causes aggregated throughput of M parallel connections to decrease when M becomes larger than an estimated optimal value (M_opt): spreading data transfer through multiple connections increases the probability that at least one last packet will get lost, causing tail loss delay.

Figure 4A:
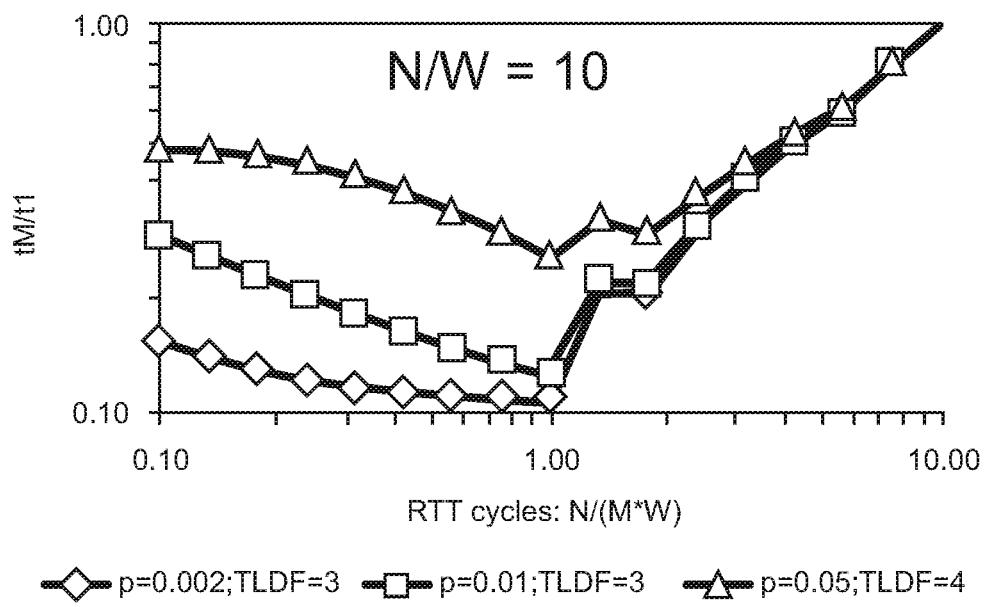
FIGS. 4a and 4b are the graphs illustrating improvements in the throughput that can be achieved by the embodiments of the present invention.
Figure 4B:
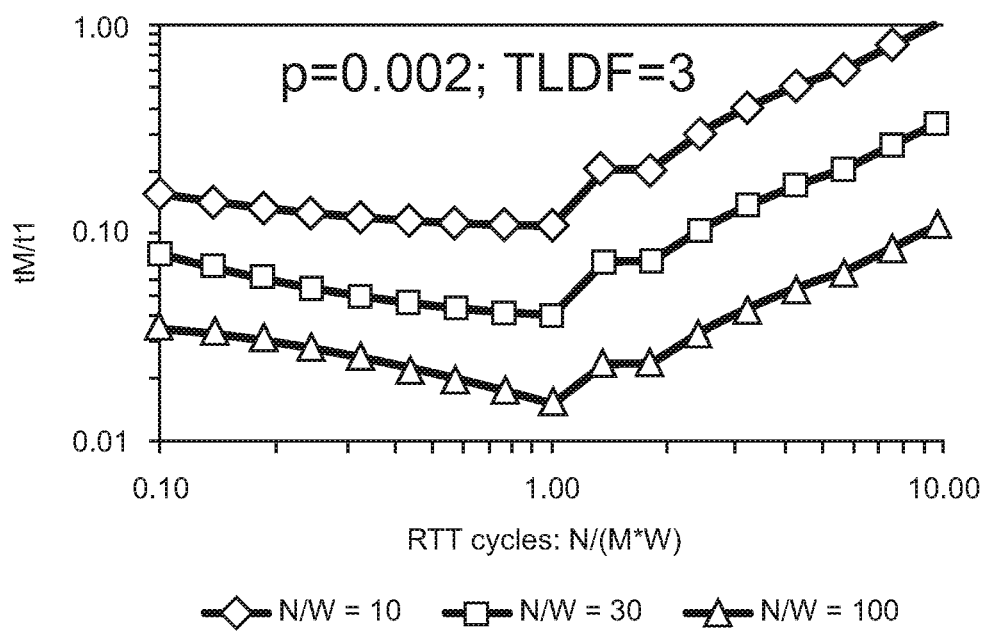

FIGS. 4a and 4b are the graphs illustrating improvements in the throughput resulting from the present invention.

FIG. 4a depicts the change of the throughput acceleration (tM/t1) with increase of the fill rate for each connection (N/(M*W)), computed from equations (3,4) for N/W=10 and three combinations of p and TLDF. It illustrates that, for realistic values of p and TLDF, best throughput acceleration is achieved when the amount of data sent through each connection is equal to the maximum amount that can be delivered in 1 RTT (N/(M*W)~=1). For instance, for p=0.01 and TLDF=3, best throughput acceleration is achieved at M=10, which is up to 2 times better than for the larger values of M.

The graph for p=0.05 and TLDF=4 shows a local minimum at N/(M*W)~=2; with further increase of p and TLDF, it becomes an absolute minimum: when packet losses are high (e.g. network quality is low), the best performance can be achieved by sending maximal amount of per-connection data that can be delivered in 2 RTTs, slowing down the average time but decreasing probability of the tail loss.

FIG. 4b depicts the change of throughput acceleration (tM/t1) with increase of the fill rate for each connection (N/(M*W)), computed from equations (3,4) for p=0.002, TLDF=3 and 3 values of N/W. It illustrates that, for the large range of N/W, the best throughput acceleration continues to be achieved when N/(M*W)~=1. If W remains the same, it means that, at least for the depicted range of N/W, the estimated optimal value of M increases proportionally with N.

If the receiver window is larger than a congestion window, W can be estimated as W=C/sqrt(p) from the Mathis equation (C~=sqrt(3/2)). For instance, p=0.002 corresponds to W=27, and N/W=100 corresponds to a file size ~4 MB.

Equations describing the estimated optimal number of connections may differ from (3-4) depending on the multiple factors. For instance, variability of the W values between different connections, caused by different rates of packet losses, different amounts of data previously sent through separate connections, or by the variable round-trip times in different connections (for instance, caused by the random retransmits inside the last-mile wireless link).

The equations may further differ with variability of the amounts of data sent through different parallel connections caused by the data distribution algorithms. For instance, by making the amount of data sent through each connection proportional to its previously observed throughput, instead of using a round-robin distribution.

The embodiments disclosed herein do not depend on the exact form of equations (3-4). These equations are included to validate assumptions used by some of the embodiments of the present invention and to establish the conditions where the embodiments could be particularly effective. For example, if delivery of the previously requested data must be confirmed before proceeding with other data transfers, there is an optimal number of parallel connections that reduces the time to complete and confirm the delivery if packet losses are present. Likewise, the optimal number of parallel connections increases with the amount of the data required to complete and confirm the delivery. The optimal number of parallel connections is usually achieved when each parallel connection is requested to deliver the maximal amount of data that can be sent and confirmed in a single round-trip cycle, or, for especially high rates of packet losses, in two round-trip cycles.

Figure 5:
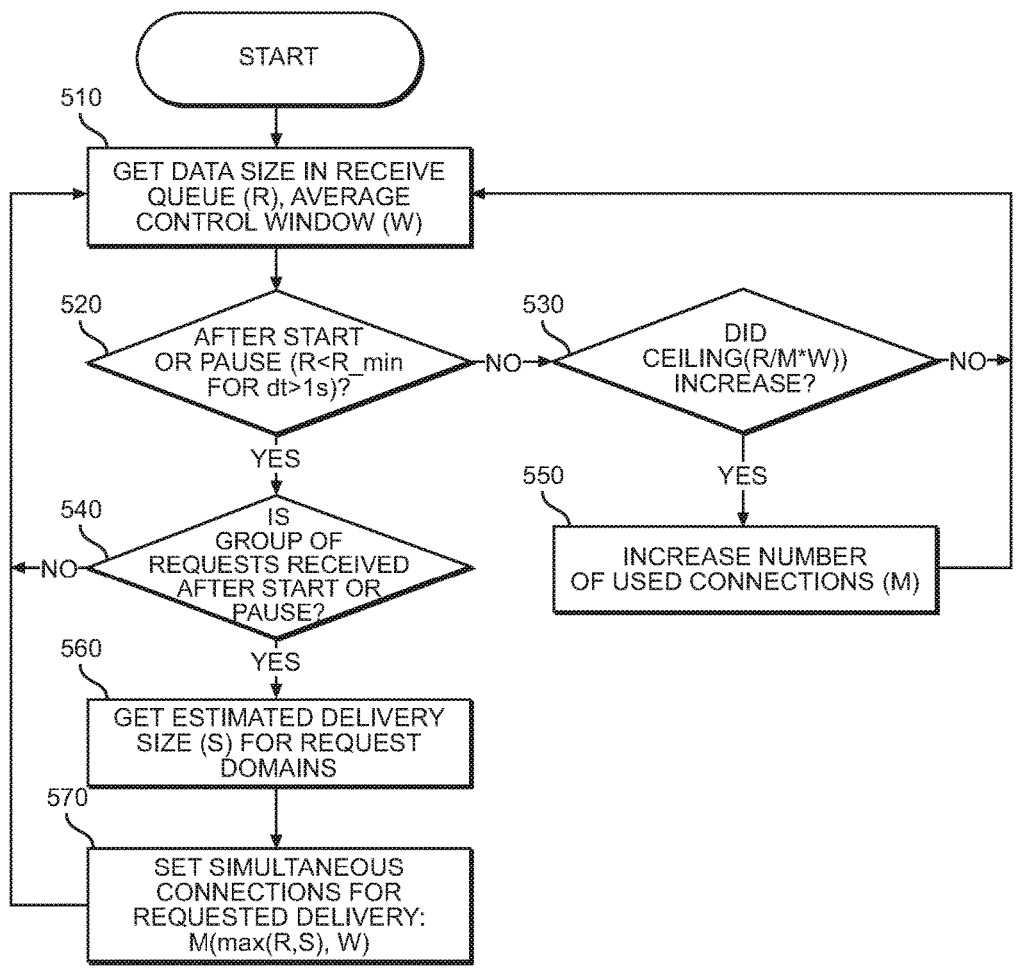
FIG. 5 is a process flow diagram of a method of changing the number of simultaneous transport connections in accordance with an embodiment of the present invention.

FIG. 5 depicts process flow diagram of a method that optimizes, e.g. significantly improves, throughput of multiple simultaneous connections by monitoring parameters of the data traffic and uses these parameters to set an estimated optimal number of connections. The method of FIG. 5 may be executed with respect to each near multipath transport manager 130 coupled to the far multipath transport manager 160 such that different computers may use different numbers of connections 140 depending on the size of the data being retrieved and attributes of the connections between the near multipath transport manager 130 and the far multipath transport manager 160.

In the described method, the multipath transport manager 130, 160 obtains parameters of a data transfer such as a data size R in a receive queue and a size of the average control window W of existing transport connections (step 510). Note that the size of W is determined by TCP protocol according to factors such as round trip time, a rate of packet loss, a distance of a network connection between two computers implementing TCP, or other factors describing a quality the network connection. The multipath transport manager 130, 160 further determines whether this is the first data transfer after a start, a pause, a stop, or a sharp decrease (e.g. 50-90% decrease) in the traffic volume for a pre-defined period of time, for instance is (step 520).

If a new group of requests from the client 110 is received after the start or pause of step 520 is detected (step 540), a delivery size N is estimated from a pattern or requested domains and request headers of the new group of requests (step 560). The number of simultaneous transport connections is then set to optimize, e.g. significantly improve, the time of the requested delivery corresponding to the new group of requests for the estimated values of R, S, and W (step 570).

While the data transfer of the requested delivery continues, at least one of the multipath transport managers 130, 160 continues to evaluate transport parameters such as R and W (step 520). If it detects an increase in the number of round-trip cycles used to deliver the remainder of the data of the requested delivery, estimated as ceiling(R/(M*W)) (step 530), the number of used connections 140 is increased to decrease the time until the requested delivery is completed (step 550). Note that inasmuch as each multipath transport manager 130, 160 operates independently, the number of used transport connections 140 to transfer data from the client 110 to the content provider 190 may be different from the number of used transport connections 140 to transfer data from the content provider to the client 110. Likewise, the number of used transport connections 140 to transfer data from the client 110 to the content provider 190 may change while the number of used transport connections 140 to transfer data from the content provider to the client 110 remains constant, and vice versa.

As described above, the number of used transport connections 140 is dependent on attributes of the transport connections, including packet loss, throughput, control window, congestion window, receiver window, and other parameters that affect the value R/(M*W) (step 530). In particular, the size of the control window W is affected by these attributes. Accordingly, differences in these attributes for the client-to-content provider connections 140 and the content-provider-to-client connections 140 detected by the multipath transport managers 130, 160 may result in differences in the number of used client-to-content provider connections 140 relative to the content-provider-to-client connections 140.

Instead of using the current size of the control window, one implementation may use the estimated size of the control window at the later time (for instance, by assuming that the size of control window will continue to increase incrementally with each round trip), or by using the Mathis equation to derive the average size of the control window from the observed rate of packet losses.

Other implementations of the method that estimates one or more parameters of the data transfer to increase the number of used connections may use a different sequence of steps, different ways to detect the start of a new limited data delivery or to estimate its size.

Accordingly, this and the other implementations have a common feature of evaluating the traffic parameters after detecting a start or a pause in the traffic, and setting the number of used simultaneous connections to a different value for different groups of requests, or for the same requests from different users. Also, implementations that re-evaluate the traffic parameters during the requested delivery have a common feature of changing the number of used simultaneous connections before requested delivery is completed.

Figure 6:
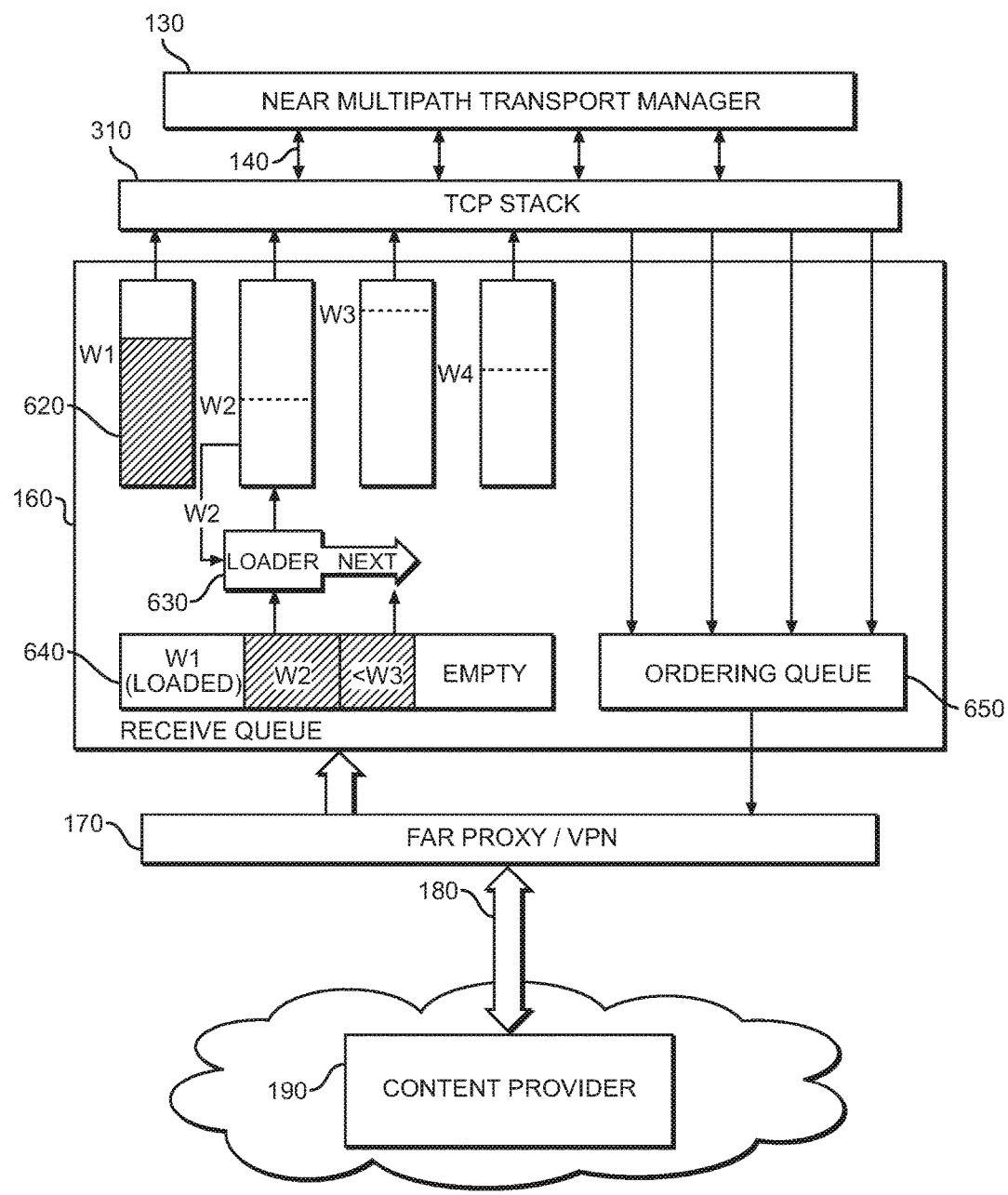
FIG. 6 is a diagram of a fourth network environment used to improve the traffic distribution through simultaneous transport connections in accordance with an embodiment of the present invention.

FIG. 6 is a diagram of the network environment used to optimize, e.g. significantly improve, the traffic distribution of a single file transfer through simultaneous transport connections, accordingly to another aspect of the present invention.

In this aspect, far multipath transport manager 160 contains a set of send buffers 620, each send buffer is feeding a separate transport connection 140 established by TCP stack 310. These send buffers could be implemented in the user space, or merged with the send buffers of transport connections provided by the TCP stack. Multipath transport manager further contains at least one loader 630 and a receive queue 640, storing the data sent through the far proxy or VPN 170 through the high-bandwidth 180 pipe from the content provider 190.

In the described implementation, loader 630 fills a set of send buffers 620 in sequence. Before sending the data for each connection, it obtains the size of its control window W, extracts the amount of data that equals W from the receive queue 640 and transfers it to the current send buffer, before further proceeding through the receive queue. Space emptied from the receive queue 640 is marked as ready to receive the next data, for instance, by shifting the pointer in a ring buffer. FIG. 6 depicts the case where the send buffer for the first transport connection has already received the amount of data equal to the size of its control window (W1); loader 630 has obtained the size of the control window for the second transport connection (W2) and is ready to transfer corresponding amount of data from the receive queue 640 to the second send buffer, before proceeding to the next send buffer (W3 in the illustrated example). If the amount of data left in the receive queue 640 is smaller than the size of the control window (as in the example shown for W3), loader 630 transfers the available amount.

In some implementations, multiple loaders 630 can be used in parallel to feed multiple send buffers 620. Likewise, different distribution algorithms could be used instead of a round-robin (for instance, connections with the highest size of the control window could be addressed first). The loader 630 may use parameters other than the size of the control window to specify amount that should be sent to each send buffer. For example, a value proportional to the average throughput of the current connection during a recent time interval (e.g. 0.1 to 10 seconds).

Accordingly to the present invention, depicted implementation, and its variations such as described above have a common feature of sending the groups of data to different transport connections, with the size of each data group being set inside a preferred range, for instance as close as possible to the size of the control window for the corresponding connection.

This enables automatic adjustment of the number of used connections to the amount of the data that remains to be delivered. For instance, if the receive queue 640 contains only enough data to fill three send buffers 620 with amounts corresponding to their control window sizes W1 to W3, other transport connections will not receive anymore data. In this way, the number of used connections 140 may raise with increase of the amount of data that has to be delivered, or with decrease of the size of one or more control windows due to the random packet losses.

In some implementations, the preferred range may include only a maximal value, such as the size of the current control window. In other implementations, it may also include a minimal value. For example, if the receive queue 640 contains less than 50% of the size of the current control window, the loader 630 will wait for one more round-trip time to receive the next data from the receive queue 640, in order to increase the probability that the maximal amount of data will be sent in a single round-trip time. Values other than 50% may be used to determine the minimal value such as a value from 40% to 60%.

If a remaining amount of data in the receive queue 640 is higher than sum of all control windows (W1 to W4 in the illustrated example), the maximal number of simultaneous connections can be set not to exceed a pre-defined limit.

In the depicted embodiment, data from the receive queue 640 is loaded into each of the send buffers 620 in sequence: a first transport connection 140 receives earlier data than a second connection 140, etc. Each data group with the size not exceeding the size of the control window of the current connection 140 can be delivered during a single round trip over the current connection. Sending a contiguous data group in one sequence has the further benefit of reducing the amount of reordering that has to be done on the receiving side.

In the depicted implementation, receiving side includes an ordering queue 650, which stores data received from the multiple transport connections 140 through the TCP stack 310, until they can be delivered in the correct order to the proxy or VPN 170. If each connection 140 delivers a contiguous set of data during each round trip, reordering is necessary only between the groups of data (for instance, if $3^{rd}$ connection delivers the data faster than a second connection) or when some data packets are lost and must be re-transmitted. If this is not implemented, for instance if sequential data packets are spread between multiple connections, packets may need to stay in the ordering queue 650 until all connections deliver all data during the current cycle, thereby increasing latency.

Figure 7:
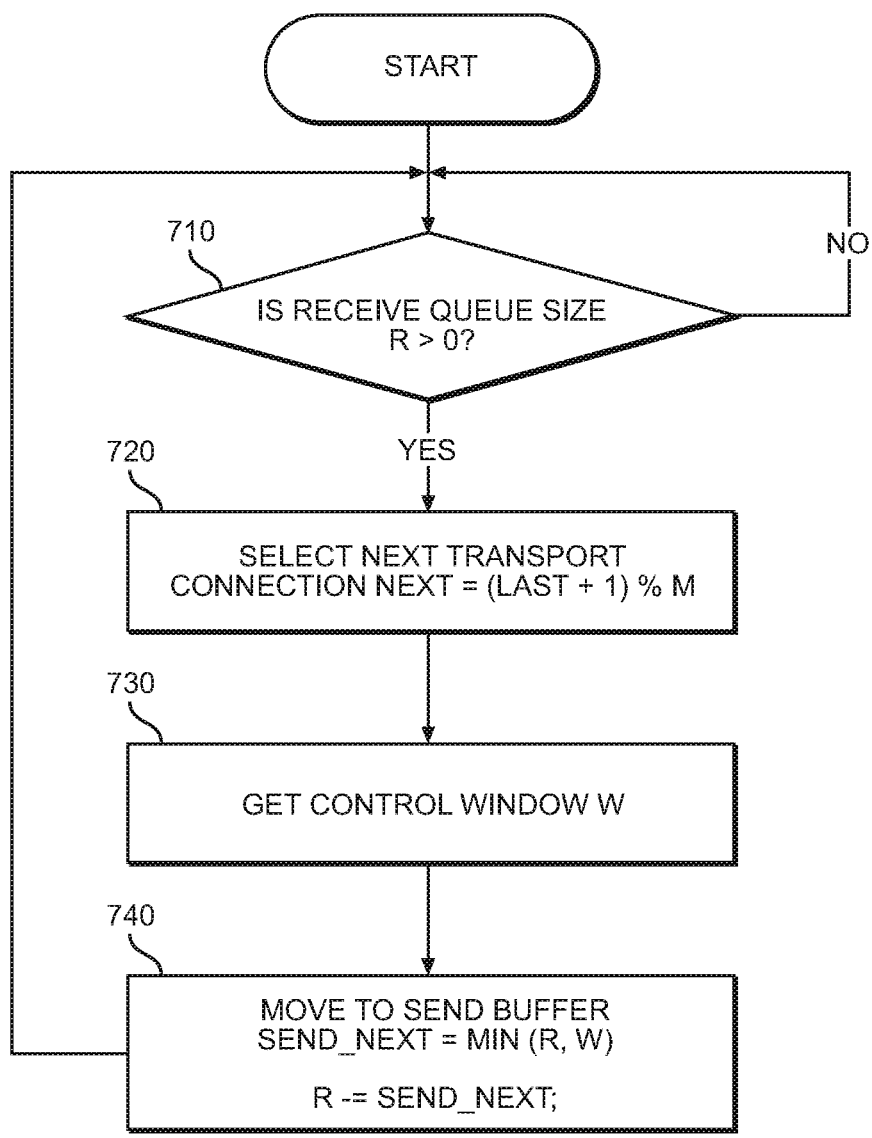
FIG. 7 is a process flow diagram of a method for improving the traffic distribution through simultaneous transport connections in accordance with an embodiment of the present invention.

FIG. 7 is a process flow diagram that illustrates a method for improving the traffic distribution through simultaneous transport connections, based on sending the data group of the preferred size through each connection.

If receive queue is not empty (step 710), the next transport connection is selected to receive a data group (step 720). In the depicted case, the next connection is selected sequentially, with a wrap over to the first connection when maximal number of connections is reached. In an alternative implementation, the next connection can be selected 720, for instance, based on the amount of data remaining in its send buffer 620 and the size of its control window. Specifically, connections 140 with empty send buffers 620 and large control windows would be selected first. After obtaining the size of the control window for the selected connection (step 730), a minimum of the size of the control window (W) and a remaining amount in the receive queue (R) is moved to the send buffer 620 of the selected connection (step 740). The size of the data remaining in the receive queue 640 is correspondingly adjusted to free the space for the next data.

Inasmuch as the control window (W) is dependent on throughput and the size of the data frames is dependent on the size of W, as outlined above. The size of the frames will therefore increase with increase in W. The throughput and control window are also dependent on packet loss rate. Accordingly, an increase or decrease in throughput may be estimated based on a decrease or increase, respectively, of the packet loss rate.

Figure 8:
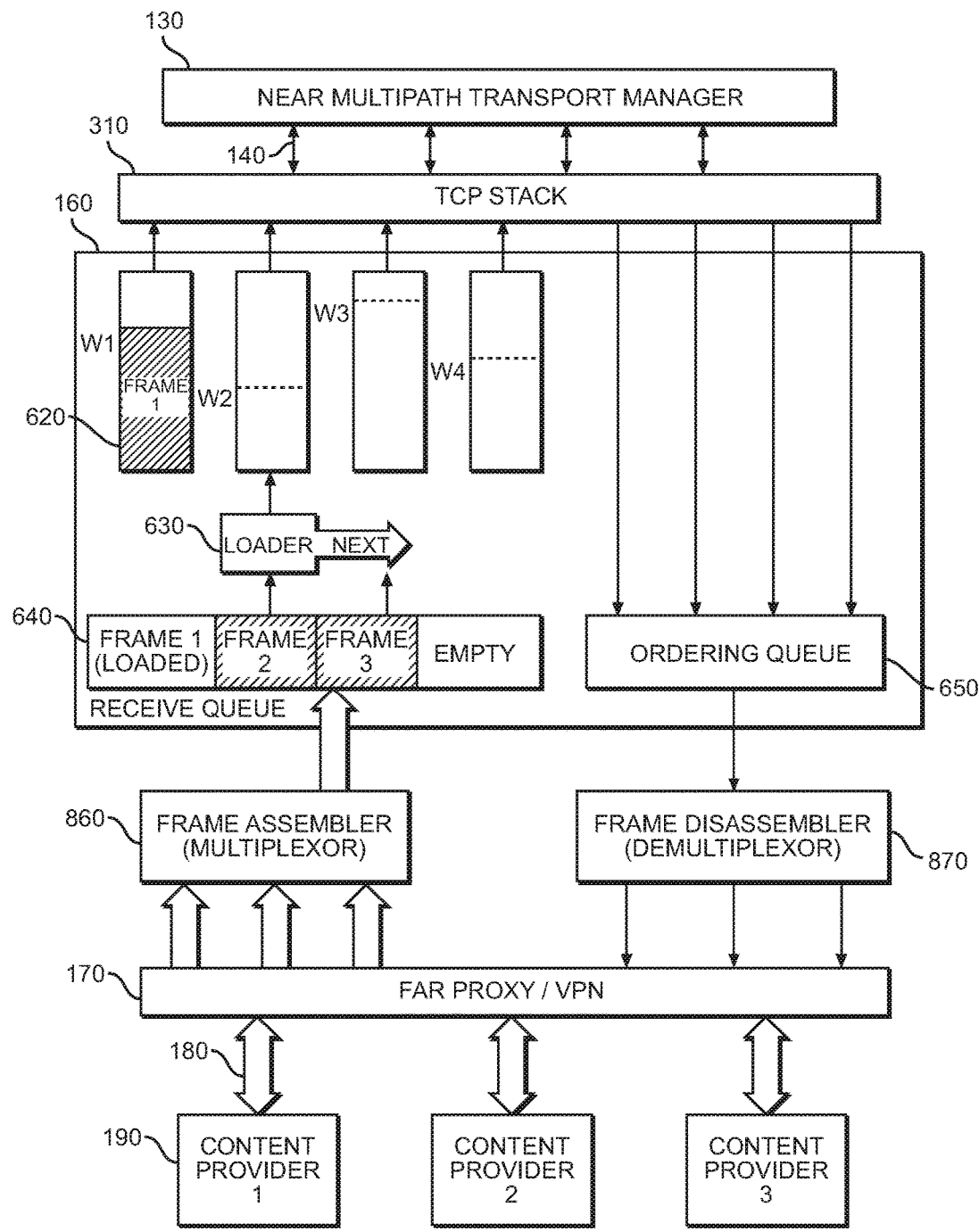
FIG. 8 is a schematic block diagram of a fifth network environment used to improve the traffic distribution through simultaneous transport connections in accordance with an embodiment of the present invention.

FIG. 8 is a diagram of the network environment used to improve the traffic distribution of multiple parallel file transfers through the simultaneous transport connections accordingly to embodiment of the present invention.

In this aspect, client 110 requests a group of files from multiple content providers 190. These files are downloaded in parallel through the proxy or VPN server 170. Before being submitted to a far multipath transport manager 160, in the described implementation the multiple download streams are sent through a frame assembler 860, which multiplexes these data streams into the single receive queue 640. In some instances, the assembly includes creating a sequence of frames, each frame having a header and a payload corresponding to a single data stream. The header may contain an identifier of the data stream and the size of the payload. The header may also contain additional parameters, such as the frame type (control or data, checksum, or additional options). In some embodiments, each frame can be formatted according to the specification of Hyper Text Transport Protocol (HTTP) version 2 or later.

Accordingly to one aspect of the present invention, the loader 630 transfers each successive frame from the receive queue 640 into the send buffer 620 of a different transport connection maintained by the TCP stack 310. In some instances, frame assembler 860 uses the same frame size for each frame. Loader 630 makes sure that each frame is transferred to the send buffer 620 of only one connection 140. In this way, the number of used transport connections increases with the amount of data in the receive queue 640, and drops when the requested delivery of the group of files nears the completion.

In some implementations, frame assembler 860 pre-sets the frame size based on the information about expected delivery size (for instance, one obtained from a pattern for the requested domains) or the sizes of control windows used by transport connections 140 (for example, to make sure that most of the frames fit into a single control window). In some embodiments, the pre-set frame size varies for different groups of requests from the same user, or for different users even if they send the same groups of requests. Frame size may also change during the data delivery. For instance, frame assembler 860 may decrease the frame size if the average size of control window decreases with time.

In some embodiments, the frame assembler 860 increases the size of one or more data frames with decrease of the remaining amount of data to be delivered. This approach ensures that each connection 140 transmits a maximal or near-maximal amount of data before switching to a different connection, where the maximal amount of data is the amount of data allowed to be transmitted before receiving an acknowledgement of at least some of the data. If different frames are sent through different connections, increasing the size of each data frame causes decrease in the number of simultaneous connections actively used to transfer the data. As noted above, for small files, this actually increases throughput when a guaranteed-delivery protocol is used.

In some embodiments the frame assembler 860 increases size of the data frames with decrease of the packet loss rate. In other embodiments, the frame assembler 860 increases the size of the data frames with increase in the amount of data allowed to be sent before receiving an acknowledgement of at least some of the data. This approach ensures that each connection sends the maximal amount, or near-maximal amount of data before switching to a different connection, where the maximal amount is the amount of data allowed to be sent before waiting for an acknowledgement of at least some of the data. Decrease of the data loss rate, or increase of the amount of data allowed to be sent before receiving an acknowledgement (increase of the control window) results in decreasing the number of simultaneous connections that are used according to the method of FIG. 5. Increasing the size of each data frame, achieves a similar result: different frames are sent through different connections such that increasing the size of each data frame causes a corresponding decrease in the number of simultaneous connections 140 actively used to transfer the data, particularly for small files.

In some instances, loader 630 selects the next connection 140 for a next frame in the receive queue 640 sequentially. In another instance, it may select the next connection 140 based on the size of its control window in order to increase the number of connections that transfer a single frame in the time of a single round trip. This becomes beneficial when frame assembler 860 forms frames of different sizes, for instance by using smaller frames for high-priority data (such as JavaScript files that may stall web site rendering) to speed up their delivery.

Accordingly to the illustrated implementation and its variations described above have a common feature of ordering the data transfer of the multiple data streams through multiple transport connections 140 by forming data frames, each frame containing only the data from a single data stream, and sending each data frame through only one transport connections; 140. Data frames from the same data stream can be sent through the multiple simultaneous transport connections 140, but each data frame can be sent only through a single transport connection.

This implementation, in addition to automatically adjusting the number of used connections, also decreases the need for data reordering on the receiver side. In the depicted embodiment, the receiver side includes the ordering queue 650. It sends the sequence of frames to the frame disassembler 870, which de-multiplexes them into the separate data streams sent through the proxy or VPN 170 to the multiple content servers 190. Ordering queue 650 only has to make sure that each frame contains all its data. As soon as all packets of the frame are delivered by a single transport connection, that frame can be immediately sent to the frame disassembler 870. In this case, ordering queue 650 never has to wait for two or more transport connections 140 before delivering an individual data frame.

Figure 9:
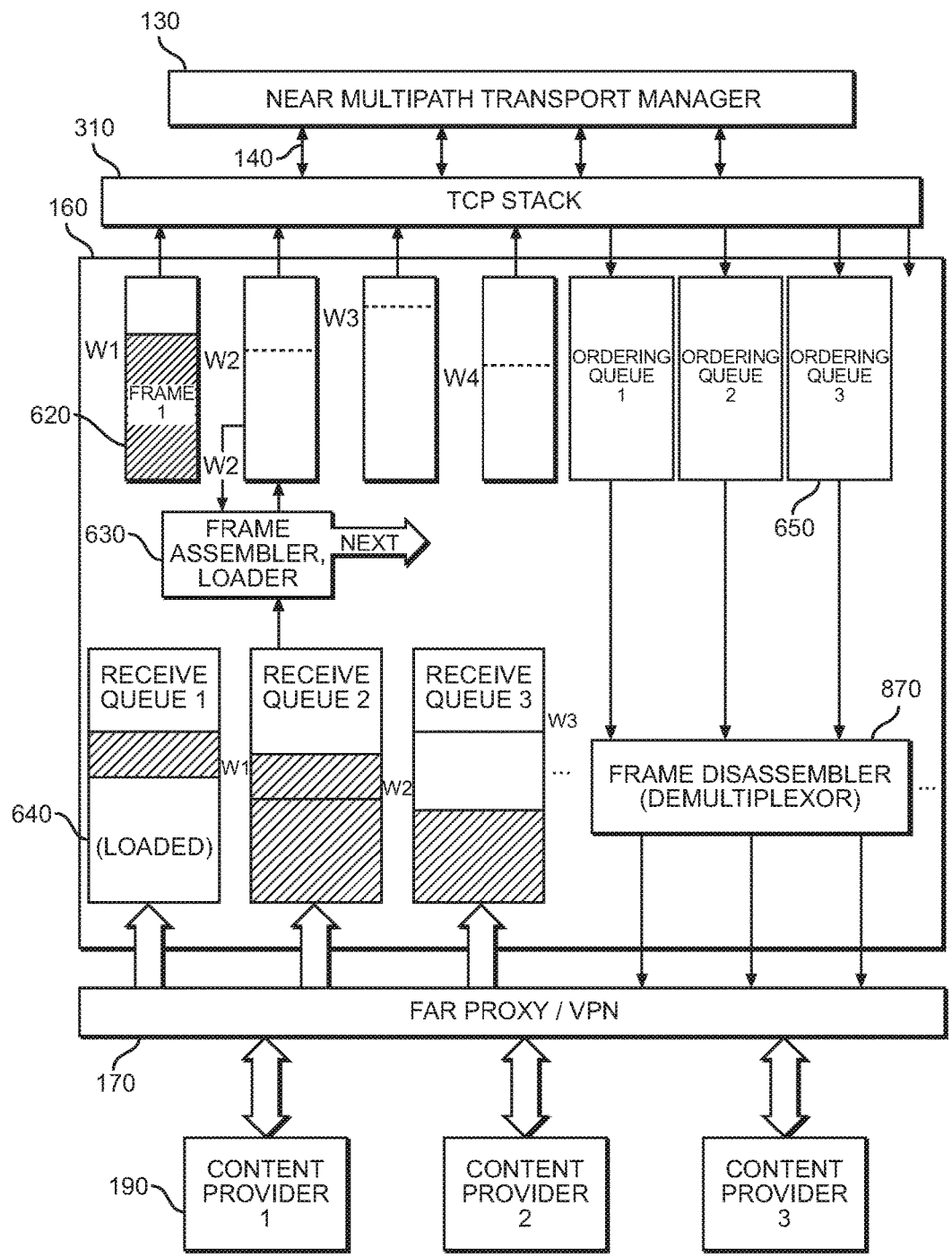
FIG. 9 is a schematic block diagram of a sixth network environment used to improve the traffic distribution through simultaneous transport connections in accordance with an embodiment of the present invention.

FIG. 9 is a diagram of the network environment used to optimize, e.g. significantly improve, the traffic distribution of multiple parallel file transfers through simultaneous transport connections accordingly to another embodiment of the present invention.

In this embodiment, multipath transport manager 160 contains multiple receive queues 640, each used to store data for a single data stream loaded from a corresponding content provider 190 through the proxy or VPN 170. In this embodiment, loader 630 also performs a function of a frame assembler. Specifically, the loader 630 selects an amount of data that has to be taken from the next receive queue 640, formats it as a frame and loads the frame into the next send buffer 620, which is used by the TCP stack 310 to transfer the data through the corresponding transport connection 140. The loader 630 then performs this function with respect to another receive queue 640 and transport connection 140.

In the described embodiment, frame assembler and loader 630 obtains the size of the control window W for each transport connection 140 and uses it to optimize the frame size, e.g. select a frame size providing improved results. For example, each frame size is set as close as possible to the size of the corresponding control window, maximizing, or at least increasing, the probability that the frame will be delivered in the time of a single round trip. In the depicted embodiment, Frame 1 of size W1 is already loaded from the first receive queue 640 to the first send buffer 620. The available space of the first receive queue 640 is then adjusted, for instance, by changing the pointer of a ring buffer. Frame assembler and loader 630 is then ready to assemble a frame of the size W2 from the second receive queue 640, and then to advance to the third receive queue 640. If the number of transport connections 140 is larger than the number of receive queues 640, queues 640 may start rotating from the beginning. In the illustrated example, the fourth send buffer 620 will receive the remaining data from the first receive queue 640, etc.

In another implementation, the loader 630 sets the frame size for data loaded into a send buffer 620 based on a previously measured throughput of the transport connection 140 corresponding to the send buffer 620. In another example, the loader 630 sets the frame size based on the type of connection 140 (for instance, wired versus wireless).

In another implementation, a next transport connection 140 may be selected by the loader 630 to receive a next frame using an algorithm that is different from a round-robin algorithm. For instance, by selecting, as the next connection 140, the connection 140 that has the largest size of control window or largest throughput over a recent time interval (e.g. 0.1 to 10 seconds) of those connections 140 that have an empty send buffer 620. The next receive queue 640 can also be selected by using a different algorithm. For instance, different receive queues 640 may be assigned different priorities and data may be assigned to the queues such that higher priority data will be assigned to a higher priority queue 640. For example, JavaScript files that may stall web site load could be assigned to a higher priority queue 640. In another example, the queue 640 with smallest amount of remaining data may be assigned a higher priority in order to speed up the download of small files in the presence of large background downloads.

The depicted implementation and its variations as described above have a common feature of ordering the data transfer of multiple data streams through multiple transport connections 140 by forming data frames, each frame containing only the data from a single data stream. Each data frame is sent through only one transport connection 140, and its size is selected for that connection to increase the throughput (for instance, by improving the probability that each frame will be sent out during a single round trip) relative to a range of other possible sizes.

Sending data frames of different sizes through the different connections also provides a benefit of a simplified reordering on the receiver side. In the described implementation, data from each transport connection 140 are stored in a separate reordering queue 650. In the depicted example, only three transport connections carry the upstream data, while another one remains unused. Each data frame may only be sent through a single transport connection 140, but each transport connection 140 may carry data frames from more than one data stream.

The depicted embodiment may benefit from the fact that data frames sent through the same transport connection 140 have the same or a similar size, which makes easier to anticipate how much memory would be required for a connection-specific re-ordering buffer, thereby increasing efficiency of memory allocation. It also makes it less resource-consuming to re-order the frames from multiple connections in parallel. As soon as all packets from any frame in any ordering queue are delivered, they are sent to the frame disassembler 870, which demultiplexes them into the separate data streams and forwards each data stream through the proxy or VPN 170 to the corresponding content provider 190.

Depicted embodiments reference Transport Control Protocol (TCP) and a TCP stack 310 as a means for the guaranteed data delivery over the multiple simultaneous connections. Other embodiments may use different delivery protocols, for instance, a User Datagram Protocol (UDP) with additional user-space flow control and congestion control modules, or a Stream Control Transmission Protocol (SCTP).

In the other embodiments, multipath traffic managers 130, 160 may be integrated with a client application executing on the client 110 and content provider's servers 190, respectively, thereby eliminating the need for the separate proxy or VPN modules 120, 170. For instance, the embodiments disclosed herein can be used to accelerate throughput of the Multipath TCP protocol extension, if it is supported by both the client 110 and the content provider 190.

In some embodiments, different data frames are sent through the different transport connections 140 sharing the same physical data link or all data links on the same route. In the other embodiments, different transport connections may use different data links, such as wired and wireless, or different routes to the same server having multiple IP addresses.

Multiple simultaneous connections may be used to transfer all traffic from the client 110 to the proxy or VPN server 120 or only part of the traffic. In some embodiments, only long-distance content is accessed through the multiple simultaneous connections 140 to mitigate the effect of the random data losses whereas content near the user is accessed directly, without spreading the load of the same file across multiple connections 140.

Figure 10:
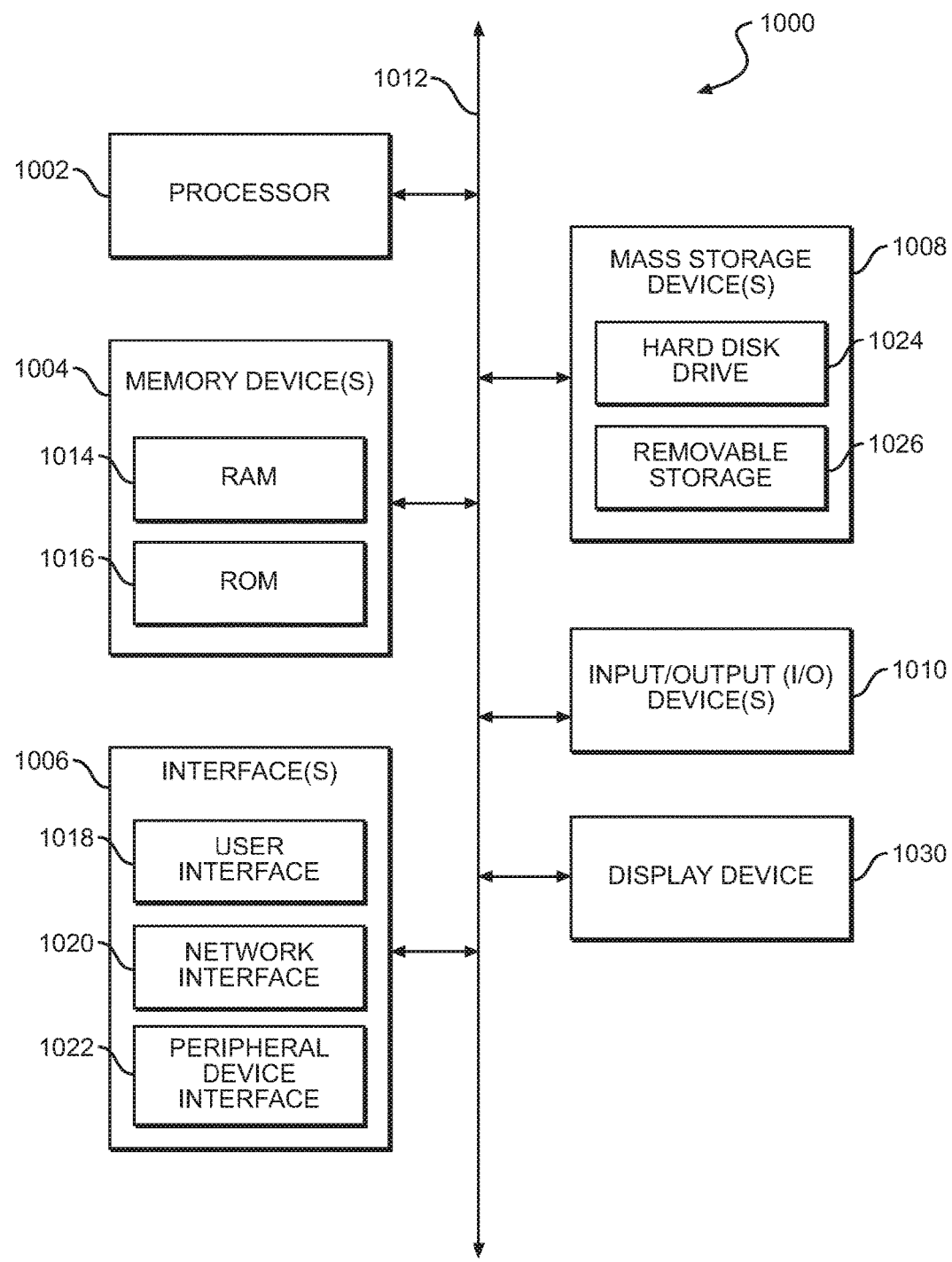
FIG. 10 is a schematic block diagram of a computer suitable for implementing the systems and methods disclosed herein.

FIG. 10 is a block diagram illustrating an example computing device 1000 which may embody any of the computers and servers disclosed herein. Computing device 1000 may be used to perform various procedures, such as those discussed herein. Computing device 1000 can function as a server, a client, or any other computing entity. Computing device can perform various monitoring functions as discussed herein, and can execute one or more application programs, such as the application programs described herein. Computing device 1000 can be any of a wide variety of computing devices, such as a desktop computer, a notebook computer, a server computer, a handheld computer, tablet computer and the like.

Computing device 1000 includes one or more processor(s) 1002, one or more memory device(s) 1004, one or more interface(s) 1006, one or more mass storage device(s) 1008, one or more Input/Output (I/O) device(s) 1010, and a display device 1030 all of which are coupled to a bus 1012. Processor(s) 1002 include one or more processors or controllers that execute instructions stored in memory device(s) 1004 and/or mass storage device(s) 1008. Processor(s) 1002 may also include various types of computer-readable media, such as cache memory.

Memory device(s) 1004 include various computer-readable media, such as volatile memory (e.g., random access memory (RAM) 1014) and/or nonvolatile memory (e.g., read-only memory (ROM) 1016). Memory device(s) 1004 may also include rewritable ROM, such as Flash memory.

Mass storage device(s) 1008 include various computer readable media, such as magnetic tapes, magnetic disks, optical disks, solid-state memory (e.g., Flash memory), and so forth. As shown in FIG. 10, a particular mass storage device is a hard disk drive 1024. Various drives may also be included in mass storage device(s) 1008 to enable reading from and/or writing to the various computer readable media. Mass storage device(s) 1008 include removable media 1026 and/or non-removable media.

I/O device(s) 1010 include various devices that allow data and/or other information to be input to or retrieved from computing device 1000. Example I/O device(s) 1010 include cursor control devices, keyboards, keypads, microphones, monitors or other display devices, speakers, printers, network interface cards, modems, lenses, CCDs or other image capture devices, and the like.

Display device 1030 includes any type of device capable of displaying information to one or more users of computing device 1000. Examples of display device 1030 include a monitor, display terminal, video projection device, and the like.

Interface(s) 1006 include various interfaces that allow computing device 1000 to interact with other systems, devices, or computing environments. Example interface(s) 1006 include any number of different network interfaces 1020, such as interfaces to local area networks (LANs), wide area networks (WANs), wireless networks, and the Internet. Other interface(s) include user interface 1018 and peripheral device interface 1022. The interface(s) 1006 may also include one or more user interface elements 1018. The interface(s) 1006 may also include one or more peripheral interfaces such as interfaces for printers, pointing devices (mice, track pad, etc.), keyboards, and the like.

Bus 1012 allows processor(s) 1002, memory device(s) 1004, interface(s) 1006, mass storage device(s) 1008, and I/O device(s) 1010 to communicate with one another, as well as other devices or components coupled to bus 1012. Bus 1012 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 1000, and are executed by processor(s) 1002. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A method for increasing an aggregated throughput of multiple simultaneous transport connections between computers over a computer network, the method comprising:

setting, by a first computer, a first number of a first plurality of simultaneous transport connections with a second computer, the first computer being configured to receive one or more first requests for data delivery from the second computer and to deliver first requested data corresponding to the one or more first requests over the first plurality of simultaneous transport connections to the second computer;

setting, by the first computer, a second number of a second plurality of simultaneous transport connections with a third computer, the first computer being configured to receive one or more second requests for data delivery from the third computer and to deliver second requested data corresponding to the one or more second requests over the second plurality of simultaneous transport connections to the third computer;

detecting, by the first computer, a difference between one or more first parameters of the first plurality of simultaneous transport connections and one or more second parameters of the second plurality of simultaneous transport connections;

setting, by the first computer, the first number of the first plurality of simultaneous transport connections and the second number of the second plurality of simultaneous transport connections to be different according to the difference between the one or more first parameters and the one or more second parameters.

2. The method of claim 1, wherein setting the first number of the first plurality of simultaneous transport connections comprises increasing the first number of the first plurality of simultaneous transport connections with at least one of increase in a distance between the first computer and the second computer and a round-trip time between the first computer and the second computer; and wherein setting the second number of the second plurality of simultaneous transport connections comprises increasing the second number of the second plurality of simultaneous transport connections with at least one of increase in a distance between the first computer and the third computer and a round-trip time between the first computer and the third computer.

3. The method of claim 1, wherein setting the first number of the first plurality of simultaneous transport connections comprises decreasing the first number of the first plurality of simultaneous transport connections with increase of a quality of a network connecting the first computer and the second computer relative to a quality of a network connecting the first computer and the third computer.

4. The method of claim 3, wherein setting the first number of the first plurality of simultaneous transport connections comprises decreasing the first number of the first plurality of simultaneous transport connections with decrease in a rate of data losses over the first plurality of simultaneous transport connections; and wherein setting the second number of the second plurality of simultaneous transport connections comprises decreasing the second number of the second plurality of simultaneous transport connections with decrease in a rate of data losses over the second plurality of simultaneous transport connections.

5. The method of claim 3, wherein each of the first plurality of transport connections and the second plurality of transport connections implement a transport protocol defining control windows that limit an amount of traffic that may be sent before an acknowledgement of at least some of the traffic has been received;

wherein setting the first number of the first plurality of simultaneous transport connections comprises decreasing the first number of the first plurality of simultaneous transport connections with increase of a size of the control windows for the first plurality of transport connections; and wherein setting the second number of the second plurality of simultaneous transport connections comprises decreasing the second number of the second plurality of simultaneous transport connections with increase of a size of the control windows for the second plurality of transport connections.

6. The method of claim 5, where the transport protocol is a Transport Control Protocol (TCP), and the control window is a smaller of a receiver window and a congestion window.

7. A system comprising:
one or more processing devices and one or more memory devices operably coupled to the one or more processing devices, the one or more memory devices storing executable code effective to cause the one or more processing devices to:
set a first number of a first plurality of simultaneous transport connections with a second computer;
receive one or more first requests for data delivery from the second computer and to deliver first requested data corresponding to the one or more first requests over the first plurality of simultaneous transport connections to the second computer;
set a second number of a second plurality of simultaneous transport connections with a third computer;
receive one or more second requests for data delivery from the third computer;
deliver second requested data corresponding to the one or more second requests over the second plurality of simultaneous transport connections to the third computer;
detect a difference between one or more first parameters of the first plurality of simultaneous transport connections and one or more second parameters of the second plurality of simultaneous transport connections;
set the first number of the first plurality of simultaneous transport connections and the second number of the second plurality of simultaneous transport connections to be different according to the difference between the one or more first parameters and the one or more second parameters.

8. The system of claim 7, wherein the executable code is further effective to cause the one or more processing devices to:
set the first number of the first plurality of simultaneous transport connections by increasing the first number of the first plurality of simultaneous transport connections with at least one of increase in a distance between the first computer and the second computer and a round-trip time between the first computer and the second computer; and
set the second number of the second plurality of simultaneous transport connections by increasing the second number of the second plurality of simultaneous transport connections with at least one of increase in a distance between the first computer and the third computer and a round-trip time between the first computer and the third computer.

9. The system of claim 7, wherein the executable code is further effective to cause the one or more processing devices to:

set the first number of the first plurality of simultaneous transport connections by decreasing the first number of the first plurality of simultaneous transport connections with increase of a quality of a network connecting the first computer and the second computer relative to a quality of a network connecting the first computer and the third computer.

10. The system of claim 9, wherein the executable code is further effective to cause the one or more processing devices to:
set the first number of the first plurality of simultaneous transport connections by decreasing the first number of the first plurality of simultaneous transport connections with decrease in a rate of data losses over the first plurality of simultaneous transport connections; and
set the second number of the second plurality of simultaneous transport connections by decreasing the second number of the second plurality of simultaneous transport connections with decrease in a rate of data losses over the second plurality of simultaneous transport connections.

11. The system of claim 9, wherein the executable code is further effective to cause the one or more processing devices to:
implement each connection of the first plurality of transport connections and the second plurality of transport connections using a transport protocol defining control windows that limit an amount of traffic that may be sent before an acknowledgement of at least some of the traffic has been received;
set the first number of the first plurality of simultaneous transport connections by decreasing the first number of the first plurality of simultaneous transport connections with increase of a size of the control windows for the first plurality of transport connections; and
set the second number of the second plurality of simultaneous transport connections by decreasing the second number of the second plurality of simultaneous transport connections with increase of a size of the control windows for the second plurality of transport connections.

12. The system of claim 11, where the transport protocol is a Transport Control Protocol (TCP), and the control window is a smaller of a receiver window and a congestion window.

13. A computer readable medium storing executable code, the computer readable medium being non-transitory and the executable code being effective to, when executed by a computing device:
set a first number of a first plurality of simultaneous transport connections with a second computer;
receive one or more first requests for data delivery from the second computer and to deliver first requested data corresponding to the one or more first requests over the first plurality of simultaneous transport connections to the second computer;
set a second number of a second plurality of simultaneous transport connections with a third computer;
receive one or more second requests for data delivery from the third computer;
deliver second requested data corresponding to the one or more second requests over the second plurality of simultaneous transport connections to the third computer;
detect a difference between one or more first parameters of the first plurality of simultaneous transport connections and one or more second parameters of the second plurality of simultaneous transport connections;

set the first number of the first plurality of simultaneous transport connections and the second number of the second plurality of simultaneous transport connections to be different according to the difference between the one or more first parameters and the one or more second parameters.

14. The computer readable medium of claim 13, wherein the executable code is further effective to cause the computing device to:

set the first number of the first plurality of simultaneous transport connections by increasing the first number of the first plurality of simultaneous transport connections with at least one of increase in a distance between the first computer and the second computer and a round-trip time between the first computer and the second computer; and set the second number of the second plurality of simultaneous transport connections by increasing the second number of the second plurality of simultaneous transport connections with at least one of increase in a distance between the first computer and the third computer and a round-trip time between the first computer and the third computer.

15. The computer readable medium of claim 13, wherein the executable code is further effective to cause the computing device to:

set the first number of the first plurality of simultaneous transport connections by decreasing the first number of the first plurality of simultaneous transport connections with increase of a quality of a network connecting the first computer and the second computer relative to a quality of a network connecting the first computer and the third computer.

16. The computer readable medium of claim 15, wherein the executable code is further effective to cause the computing device to:

set the first number of the first plurality of simultaneous transport connections by decreasing the first number of the first plurality of simultaneous transport connections with decrease in a rate of data losses over the first plurality of simultaneous transport connections; and set the second number of the second plurality of simultaneous transport connections by decreasing the second number of the second plurality of simultaneous transport connections with decrease in a rate of data losses over the second plurality of simultaneous transport connections.

17. The computer readable medium of claim 15, wherein the executable code is further effective to cause the computing device to:

implement each of the first plurality of transport connections and the second plurality of transport connections using a transport protocol defining control windows that limit an amount of traffic that may be sent before an acknowledgement of at least some of the traffic has been received;

set the first number of the first plurality of simultaneous transport connections by decreasing the first number of the first plurality of simultaneous transport connections with increase of a size of the control windows for the first plurality of transport connections; and set the second number of the second plurality of simultaneous transport connections by decreasing the second number of the second plurality of simultaneous transport connections with increase of a size of the control windows for the second plurality of transport connections.

18. The computer readable medium of claim 13, wherein the executable code is further effective to cause the computing device to:

implement the transport protocol is a Transport Control Protocol (TCP), and the control window is a smaller of a receiver window and a congestion window.

* * * * *